US010992488B2

(12) United States Patent
Le

(10) Patent No.: US 10,992,488 B2
(45) Date of Patent: Apr. 27, 2021

(54) SYSTEM AND METHOD FOR AN ENHANCED FOCUS GROUP PLATFORM FOR A PLURALITY OF USER DEVICES IN AN ONLINE COMMUNICATION ENVIRONMENT

(71) Applicant: Elizabeth K. Le, San Francisco, CA (US)

(72) Inventor: Elizabeth K. Le, San Francisco, CA (US)

(*) Notice: Subject to any disclaimer, the term of this patent is extended or adjusted under 35 U.S.C. 154(b) by 191 days.

(21) Appl. No.: 15/842,307

(22) Filed: Dec. 14, 2017

(65) Prior Publication Data
US 2019/0190730 A1 Jun. 20, 2019

(51) Int. Cl.
| | | |
|---|---|---|
| H04L 12/24 | (2006.01) | |
| H04L 29/08 | (2006.01) | |
| H04W 4/00 | (2018.01) | |
| H04L 12/18 | (2006.01) | |
| H04L 12/58 | (2006.01) | |
| G06N 20/00 | (2019.01) | |

(52) U.S. Cl.
CPC .......... *H04L 12/1822* (2013.01); *H04L 51/32* (2013.01); *G06N 20/00* (2019.01); *H04L 51/16* (2013.01)

(58) Field of Classification Search
CPC ..... H04L 12/1822; H04L 51/32; H04L 51/16; G06N 20/00
USPC ...................................................... 709/206
See application file for complete search history.

(56) References Cited

U.S. PATENT DOCUMENTS

| | | | |
|---|---|---|---|
| 7,152,092 B2 | 12/2006 | Beams et al. | |
| 8,122,086 B1* | 2/2012 | King | G06Q 10/107 709/206 |
| 8,676,913 B1* | 3/2014 | Roche | H04L 51/32 709/206 |
| 9,241,015 B1* | 1/2016 | Villalobos | H04L 65/403 |
| 2001/0029455 A1* | 10/2001 | Chin | G06F 17/273 704/277 |
| 2011/0271230 A1* | 11/2011 | Harris | G06F 3/0482 715/810 |
| 2013/0024789 A1* | 1/2013 | Adkins | G06Q 10/10 715/758 |

(Continued)

FOREIGN PATENT DOCUMENTS

WO WO-2006031466 A2 * 3/2006 ............. G06F 40/40

OTHER PUBLICATIONS

Gregorio Convertino et al., A Role-Based Multiple View Approach to Distributed Geo-Collaboration, 2007, pp. 561-570, vol. 4553, Springer, Berlin, Heidelberg.

*Primary Examiner* — Moustafa M Meky
*Assistant Examiner* — Elizabeth Kassa
(74) *Attorney, Agent, or Firm* — Gustavo Marin; Marin Patents LLC

(57) ABSTRACT

A system and method for management of an online focus group-style discussion comprising a transformation engine that allows for event-based modification and transformation of content for a discussion group view interface. In a preferred embodiment, multiple interfaces tailored to the specific role of a user device are provided. Moreover, the system can auto-generate translations in real time to accommodate a plurality of language capabilities of a plurality of users associated to a plurality of user devices for conducting focus group systems and method online.

12 Claims, 21 Drawing Sheets

(56) References Cited

U.S. PATENT DOCUMENTS

| | | | | |
|---|---|---|---|---|
| 2016/0127683 A1* | 5/2016 | Hanson | ............... | H04N 7/15 |
| | | | | 348/14.08 |
| 2016/0352674 A1* | 12/2016 | Strom | ............... | H04L 51/066 |
| 2018/0270122 A1* | 9/2018 | Brown | ............... | H04L 69/40 |
| 2018/0276202 A1* | 9/2018 | Baek | ............... | H04L 51/04 |
| 2018/0278568 A1* | 9/2018 | Strom | ............... | H04L 51/32 |

* cited by examiner

'Configuring The Event Data To A Discussion Group Platform' 1700

'Method For Recruiting Respondent In Person' 1800

'Method For Recruiting Respondent Via Paper Form' 1900

'Method For Recruiting Respondent By Phone' 2000

'Method For Recruiting Respondent Via An Anonymous Link' 2100

'Method For Recruiting Respondent Via An Advertisement' 2200

'Method For Recruiting Respondent Via The Web' 2300

SYSTEM AND METHOD FOR AN ENHANCED FOCUS GROUP PLATFORM FOR A PLURALITY OF USER DEVICES IN AN ONLINE COMMUNICATION ENVIRONMENT

CROSS REFERENCE TO RELATED APPLICATIONS

Not applicable.

BACKGROUND

Field of the Invention

The disclosure as detailed herein is in the technical field of conversational interaction applications. More specifically, the present disclosure relates to the technical field of configurable engines. Even more specifically, the present disclosure relates to the technical field of real-time data transformations via an application programming interface.

Description of Related Art

Online chatting provides conversation between users by providing a technical platform whereby a connection to a plurality of user devices can be established allowing text in the form of responses back and forth to one user device to another. Online chats are typically conducted synchronously (i.e. in real-time), unlike internet forums and other asynchronous online means of communication. This facilitates a virtual conversation that mimics a real-world conversational exchange for designated purposes.

Focus groups are used in research settings to gather qualitative responses for a particular topic. This is done via guided discussions, usually led by a moderator, in which respondents provide their opinions, beliefs, perceptions, and attitudes on the topic provided. Sometimes, focus groups are held in rooms with two-way mirrors. This allows clients and/or organizers of the focus group to view the discussion without being seen, and for respondents to participate without noticing that they are being observed.

For online conversations, online focus group platforms facilitate a typically diverse group of people assembled in an online platform to participate in a guided discussion about, for example, a particular product before it is launched, or to provide ongoing feedback on a political campaign, television series, etc. However, existing online focus group forums do not integrate digital content fluidly e.g. videos, images, weblinks, etc. that encourage participation or honest and insightful feedback, which is a key component in research. Accordingly, it is common in the art for general purpose social media platforms (i.e. those not specifically designed for focus groups) to be used to glean insights for focus group purposes, for example, seven in ten Americans use social media such as Facebook for sharing stories and having conversations with a large group of people. Worldwide, it is the most used social media platform. However, as a focus group platform, its inefficiencies are numerous, and a more purposeful platform is needed.

A problem with systems known in the art is that in a social media conversation thread, i.e. a general purpose social platform, have only a single view. This means all users regardless of their role, is able to see the same unfiltered conversation thread; and any replies, comments, or annotations, are thus shared with the entire group (or whomever is invited into that social media conversation thread). Therefore, if you have a respondent group (those who are invited to actively answer questions posed by the moderator in the conversation) versus a client group (those who are invited to observe the conversation), the client group cannot annotate or comment on the conversation with other clients without interfering with the respondent conversation thread.

A further problem with systems known in the art is that while social media platforms offer some translation services, there is a limited integration capability, specifically, the number of languages supported, and the quality of the translations (e.g. often less than 60% accurate). For focus groups, the understanding of nuances within participant discourse, specifically across language barriers, is essential and literal translations are insufficient, which is what is mostly being provided by current systems and methods.

Currently, an ability to prepare focus group content as computable data does not exist with systems known in the art making it difficult to parse, analyze and report on the data.

A further problem with systems known in the art is that as an online focus group conversation evolves in real-time, there is no way for clients or researchers to weight portions of the conversations based on importance by, for example, providing annotations or tagging to identify important or relevant elements for analysis, reporting, and for training and testing (for machine learning) purposes. Current systems known in the art rely on a completed conversation thread with no segmentation of analyses directed at a particular subgroup. Thus, the data export is not tailored or customized to the relevant groups, for example, clients or researchers.

What is needed in the art, is a system and method for preparing focus group data to facilitate the application of analytic and machine learning algorithms, for example, text analysis, sequence classification, sentiment analysis, and the like.

What is further needed in the art, is a system and method to allow a conversation to be published in real-time with multiple views based on the role or group designated to the participants, for example, researcher, client versus respondent, and the like. Accordingly, a client group would be able to annotate conversation elements in a weighted fashion and define access control of annotations without interfering with a respondent view of the conversation thread. Moreover, additional groups (for example researchers) may also be invited to the client group to provide annotation in real-time for an online conversation whereby access may be controlled for annotations and other participant data.

What is further needed in the art, is a system and method for accurate simultaneous translation to overcome language barriers between participants by providing a translated view by integrating to unsupervised translation technology optionally coupled with a supervised translation that allows any unsupervised machine translation to be reviewed by a user device (by accepting complimentary user input or by an additional remote machine translation process) before comments are published in another viewing option.

What is further needed in the art, are analytic methods to analyze and parse discourse and annotation data for sentiment analysis, sequence classification analysis, and the like. Sentiment analysis may allow a grouping of data into emotional groupings. Sequence classification analysis may allow a grouping of data by identifying and weighting reoccurring constituent words and/or themes within a parsed sentence, and the like.

What is further needed is for systems and methods to provide interactive collaboration among, for example, clients and researchers in a conversational thread, which is key to extracting insights from an online focus group. Tagging real-time conversation threads may allow classification of responses into key themes for further reporting and analysis. This makes reporting much more efficient and ideas that are gleaned from the conversation thread may be further expanded in an interactive real-time environment that does not interfere with input and activities by respondents.

SUMMARY OF THE INVENTION

This invention relates to a system that allows a focus group-style discussion group to be conducted online. It provides multiple interfaces tailored to the specific role of a user. Moreover, the system can auto-generate translations, to accommodate the language capability of a user. These translations can be reviewed by a person to ensure accuracy.

A respondent may be a participant in a discussion group who acts in the role of research subject by providing responses to particular topics. A client may be a user who requests that a discussion group be conducted in order to gather information on a particular topic. An event administrator may be an organizer of the discussion group. A recruiter may be used to identify and sign up respondents, whereas a screener may be used to vet potential respondents' suitability to participate. A moderator via a moderator device may oversee and preside over the discussion group. An expert may be a user who may be selected to participate in a discussion group because of their knowledge and expertise on the particular topic. A translation reviewer evaluates the auto-generated discussion translation for accuracy, thereby supplementing the system's translation capability.

DETAILED DESCRIPTION

Figure 1:
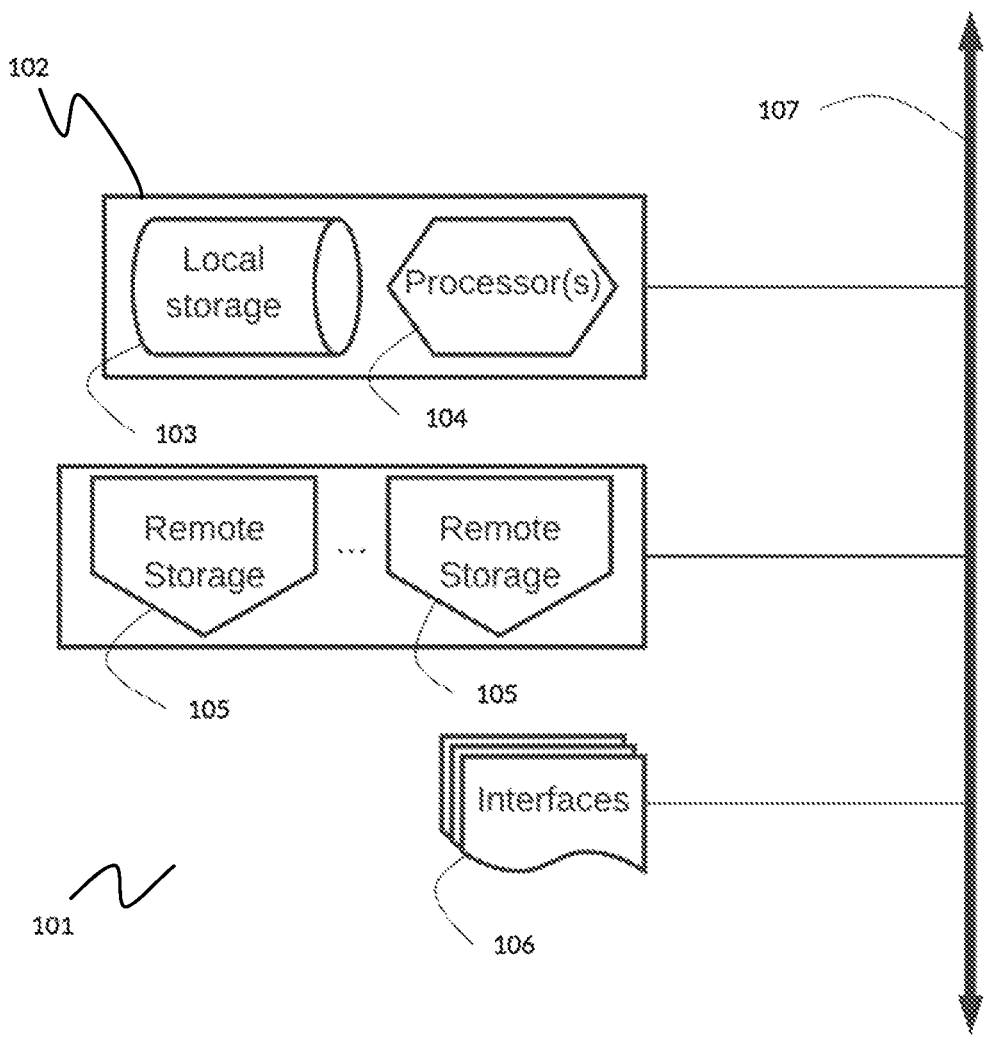
FIG. 1 is an exemplary hardware architecture of a computing device used in an embodiment of the invention.

One or more different inventions may be described in the present application. Further, for a of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure.

In general, embodiments are described in sufficient detail to enable those skilled in the art to practice a of the inventions, and it should be appreciated that other embodiments may be utilized and that structural, logical, software, electrical and other changes may be made without departing from the scope of the particular inventions. Accordingly, one skilled in the art will recognize that a of the inventions may be practiced with various modifications and alterations.

Particular features of the inventions described herein may be described with reference to a particular embodiments or figures that form a part of the present disclosure, and in which are shown, by way of illustration, specific embodiments of a of the inventions. It should be appreciated, however, that such features are not limited to usage in the particular embodiments or figures with reference to which they are described. The present disclosure is neither a literal description of all embodiments of a of the inventions nor a listing of features of a of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through a communication means or intermediaries, logical or physical.

A description of an embodiment with several components in communication with each other does not imply that all such components are required. To the contrary, a variety of optional components may be described to illustrate a wide variety of possible embodiments of a of the inventions and in order to more fully illustrate a aspects of the inventions.

Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical.

Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to a of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by a other devices that are not explicitly described as having such functionality or features. Thus, other embodiments of a of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include a executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols.

A general architecture for some of these machines may be described herein in order to illustrate an exemplary means by which a given unit of functionality may be implemented. According to specific embodiments, at least some of the features or functionalities of the various embodiments disclosed herein may be implemented on a general-purpose computers associated with a networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in a virtualized computing environments (e.g., network computing clouds, virtual machines hosted on a physical computing machines, or other appropriate virtual environments).

Referring now to FIG. 1, which shows an exemplary hardware architecture of a computing device used in an embodiment of the invention. Computing device 101 comprises an electronic device capable of executing software- or hardware-based instructions according to programs stored in memory. In some embodiments, examples of computing device 101 may include: desktop computers, carputers, game consoles, laptops, notebook, palmtop, tablet, smartphones, smartbooks, or a server system utilizing CPU 102, local memory 103 and/or remote memory 105, and interface 106.

CPU 102 comprises a unit responsible for implementing specific functions associated with the functions of specifically configured computing device or machine. The central processing unit is an acronym which stands for CPU 102. In some embodiments, examples of CPU 102 may include: a system-on-a-chip (SOC) type hardware, a Qualcomm SNAPDRAGON™, or a Samsung EXYNOS™ CPU.

Local memory 103 comprises physical devices used to store programs (sequences of instructions) or data (e g. program state information) on a temporary or permanent basis for use in a computer or other digital electronic device, which may be configured to couple to the system in many different configurations. In some embodiments, examples of local memory 103 may include: a non-volatile random-access memory (RAM), a read-only memory (ROM), or levels of cached memory.

Processor 104 comprises a component that performs the instructions and tasks involved in computer processing. In some embodiments, examples of processor 104 may include: an Intel processor, an ARM processor, a Qualcomm processor, an AMD processor, application-specific integrated circuits (ASICs), electrically erasable programmable read-only memories (EEPROMs), field-programmable gate arrays (FPGAs), a mobile processor, a microprocessor, a microcontroller, a microcomputer, a programmable logic controller, or a programmable circuit.

Remote memory 105 comprises a service that provides users with a system for the backup, storage, and recovery of data.

Interface 106 comprises a mechanism to control the sending and receiving of data packets over a computer network or support peripherals used with the computing device 101. In some embodiments, examples of interface 106 may include: network interface cards (NICs), ethernet interfaces, frame relay interfaces, cable interfaces, DSL interfaces, token ring interfaces, graphics interfaces, universal serial bus (USB) interfaces, Serial port interfaces, Ethernet interfaces, FIREWIRE™ interfaces, THUNDERBOLT™ interfaces, PCI interfaces, parallel interfaces, radio frequency (RF) interfaces, BLUETOOTH™ interfaces, near-field communications interfaces, 802.11 (WiFi) interfaces, frame relay interfaces, TCP/IP interfaces, ISDN interfaces, fast Ethernet interfaces, Gigabit Ethernet interfaces, Serial ATA (SATA) or external SATA (ESATA) interfaces, a high-definition multimedia interface (HDMI), a digital visual interface (DVI), analog or digital audio interfaces, asynchronous transfer mode (ATM) interfaces, high-speed serial interface (HSSI) interfaces, Point of Sale (POS) interfaces, or fiber data distributed interfaces (FDDIs).

Communications network 107 comprises a communications network that allows computers to exchange data using known protocols. In some embodiments, examples of communications network 107 may include: a personal area network, a wireless personal area network, a near-me area network, a local area network, a wireless local area network, a wireless mesh network, a wireless metropolitan area network, a wireless wide area network, a cellular network, a home area network, a storage area network, a campus area network, a backbone area network, a metropolitan area network, a wide area network, an enterprise private network, a virtual private network, an intranet, an extranet, an Inter-network, an Internet, a near field communications, a mobile telephone network, a CDMA network, a GSM cellular networks, or a WiFi network.

Figure 2:
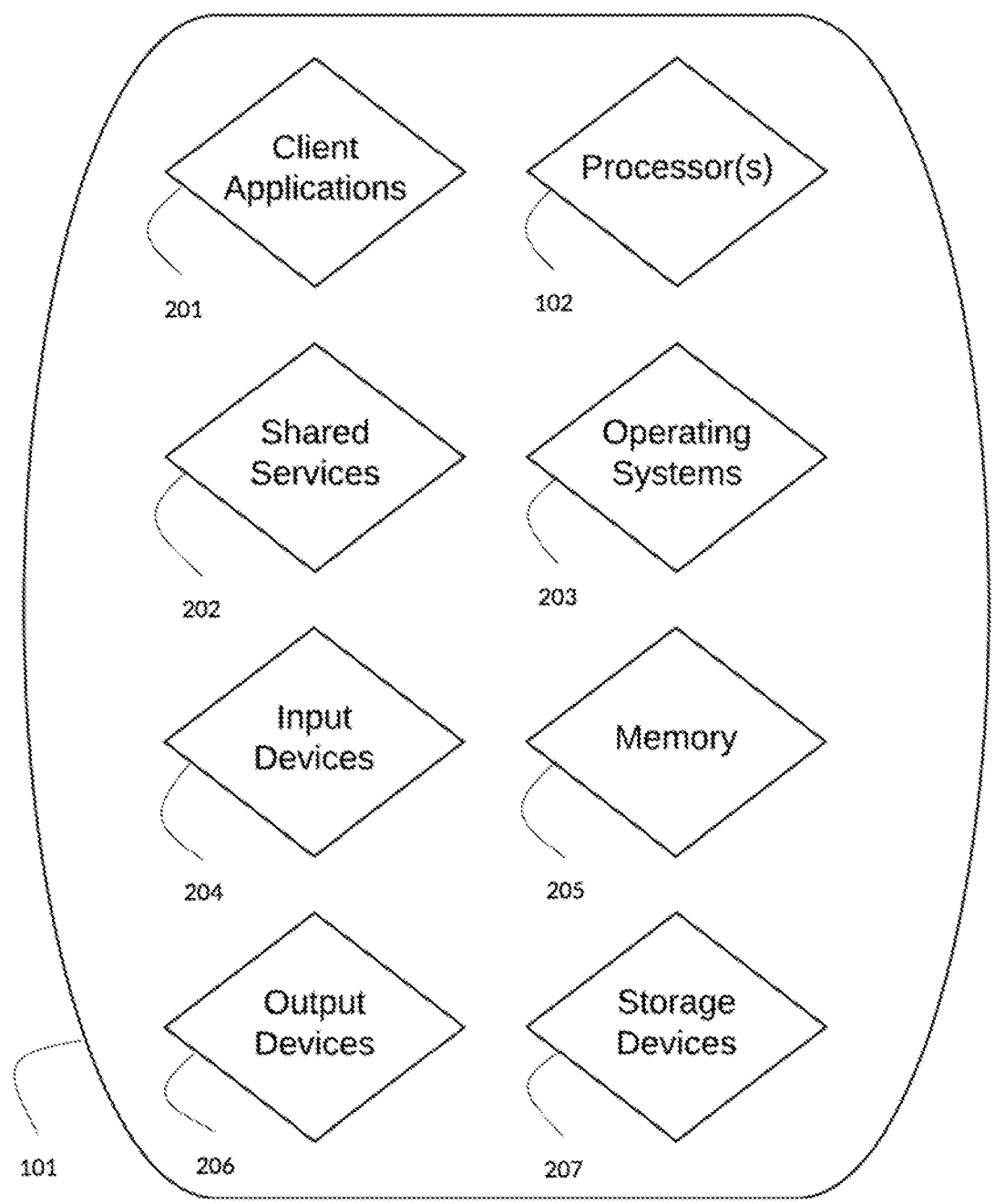
FIG. 2 is an exemplary logical architecture for a client device, according to an embodiment of the invention.

Referring now to FIG. 2, which shows an exemplary logical architecture for a client device, according to an embodiment of the invention.

Client application 201 comprises a computing device 101 capable of obtaining information and applications from a server. Shared service 202 comprises a web-enabled services or functionality related to a computing device 101.

Operating systems 203 comprises a system software that manages computer hardware and software resources and provides common services for computer programs. In some embodiments, examples of operating systems 203 may include: Microsoft WINDOWS™, Apple's Mac OS/X, iOS operating systems, Linux operating systems, or Google's ANDROID™ operating systems.

Input devices 204 comprises a device of any type suitable for receiving user input. In some embodiments, examples of input devices 204 may include: a keyboard, a touchscreen, a microphone, a mouse, a touchpad, or a trackball.

Memory 205 comprises a mechanism designed to store program instructions, state information, and the like for performing various operations described herein, may be storage devices 207, in some embodiments. In some embodiments, examples of memory 205 may include: read-only memory (ROM), read-only memory (ROM) devices, memristor memory, random access memory (RAM), or RAM hardware modules.

Output devices 206 comprises a device of any type suitable for outputting computing device 101 related information. In some embodiments, examples of output devices 206 may include: screens for visual output, speakers, or printers.

Storage devices 207 comprises a mechanism designed to store information which in some embodiments may be memory 205. In some embodiments, examples of storage devices 207 may include: magnetic media, hard disks, floppy disks, magnetic tape, optical media, CD-ROM disks, magneto-optical media, optical disks, flash memory, solid state drives (SSD), "hybrid SSD" storage drives, swappable flash memory modules, thumb drives, thumb drives, removable optical storage discs, or electrical storage devices.

Figure 3:
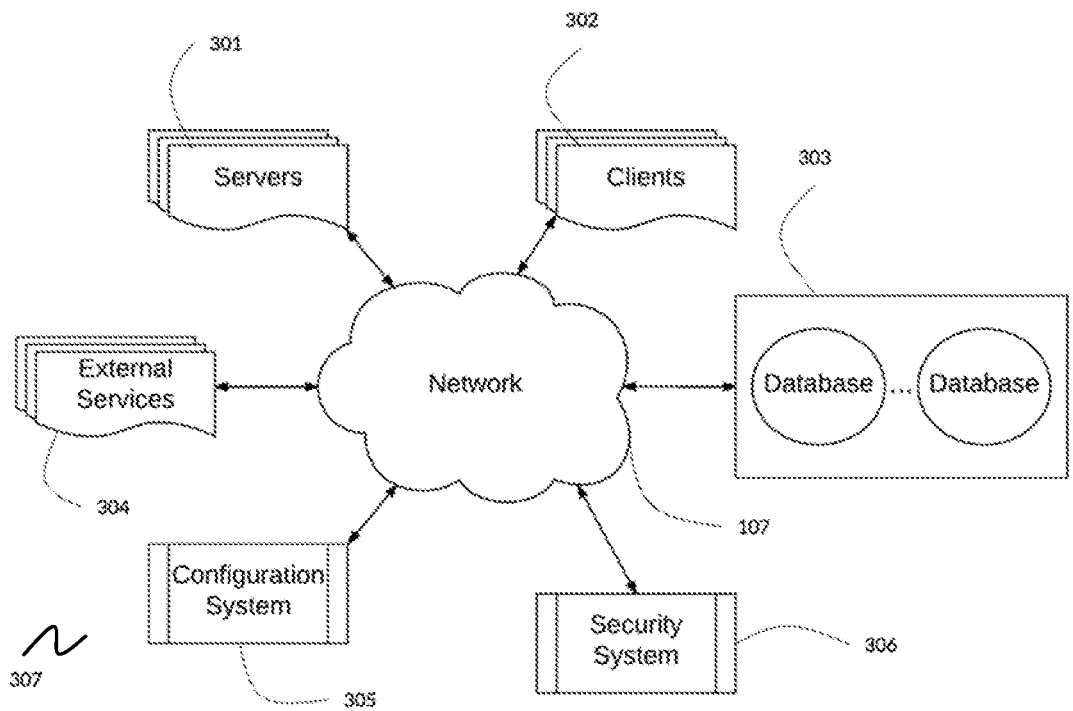
FIG. 3 is an exemplary architectural arrangement of clients, servers, and external services, according to an embodiment of the invention.

Referring now to FIG. 3, which shows an exemplary architectural arrangement of clients, servers, and external services, according to an embodiment of the invention.

Server 301 comprises a computing device 101 configured to handle requests received from a client 302 over a communications network 107. Client 302 comprises a computing device 101 with program instructions for implementing client-side portions of the present system which in some embodiments, may be connected to a communications network 107.

Database 303 comprises program instructions to provide an organized collection of data within a related system, designed to allow the definition, creation, querying, update, and administration of databases. In some embodiments, examples of database 303 may include: a relational database system, a NoSQL system, a Hadoop system, a Cassandra system, a Google BigTable, column-oriented databases, in-memory databases, or clustered databases.

External service 304 comprises web-enabled services or functionality related to or installed on a computing device 101 itself which may be deployed on a of a particular enterprise's or user's premises. Configuration system 305 comprises a system common to information technology (IT) and web functions that implements configurations or management system. Security system 306 comprises a system common to information technology (IT) and web functions that implements security related functions for the system. Distributed computing network 307 comprises any number of Client and/or Server operably connected to a Communications Network for the purposes of implementing the system.

Figure 4:
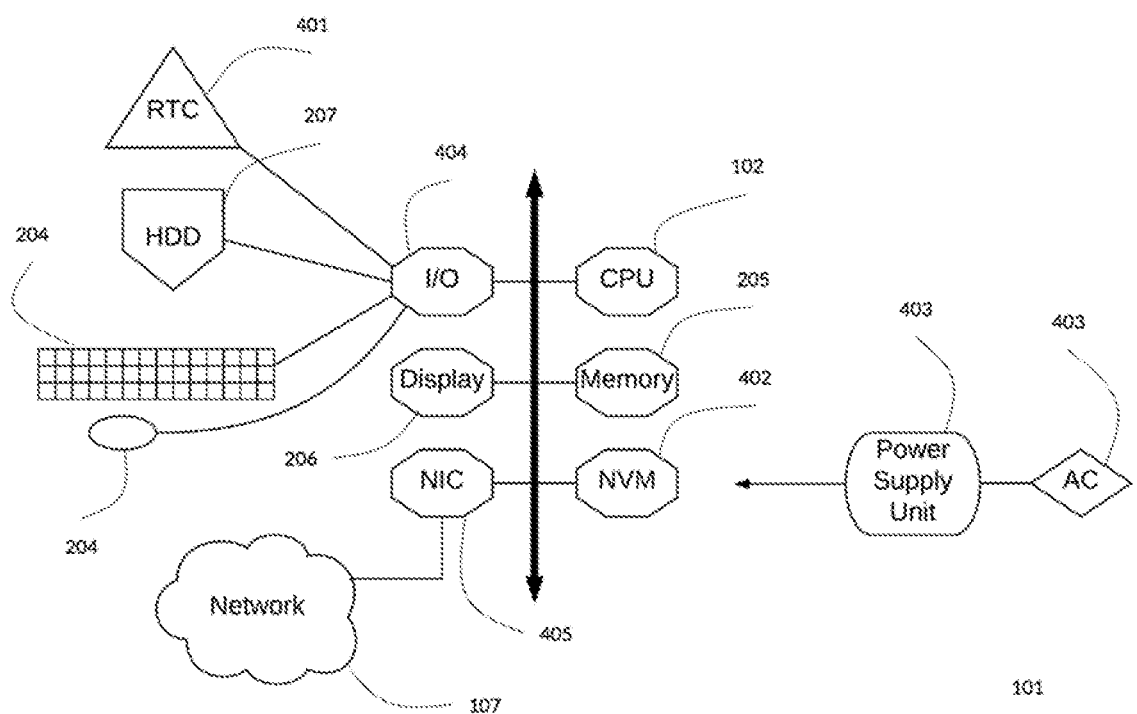
FIG. 4 is an embodiment of a hardware architecture of a computing device connected to a network used in various embodiments of the invention.

Referring now to FIG. 4, which shows an embodiment of a hardware architecture of a computing device connected to a network used in various embodiments of the invention.

Real time clock 401 comprises a computing device 101 clock (most often in the form of an integrated circuit) that keeps track of the current time. Nonvolatile memory 402 comprises a computer memory that can retrieve stored information even after having been power cycled (turned off and back on). Power supply 403 comprises an electronic device that supplies electric energy to an electrical load. Input output units 404 comprises devices used by a human (or other system) to communicate with a computer. NIC 405 comprises a computer hardware component that connects a computer to a computer network.

Figure 5:
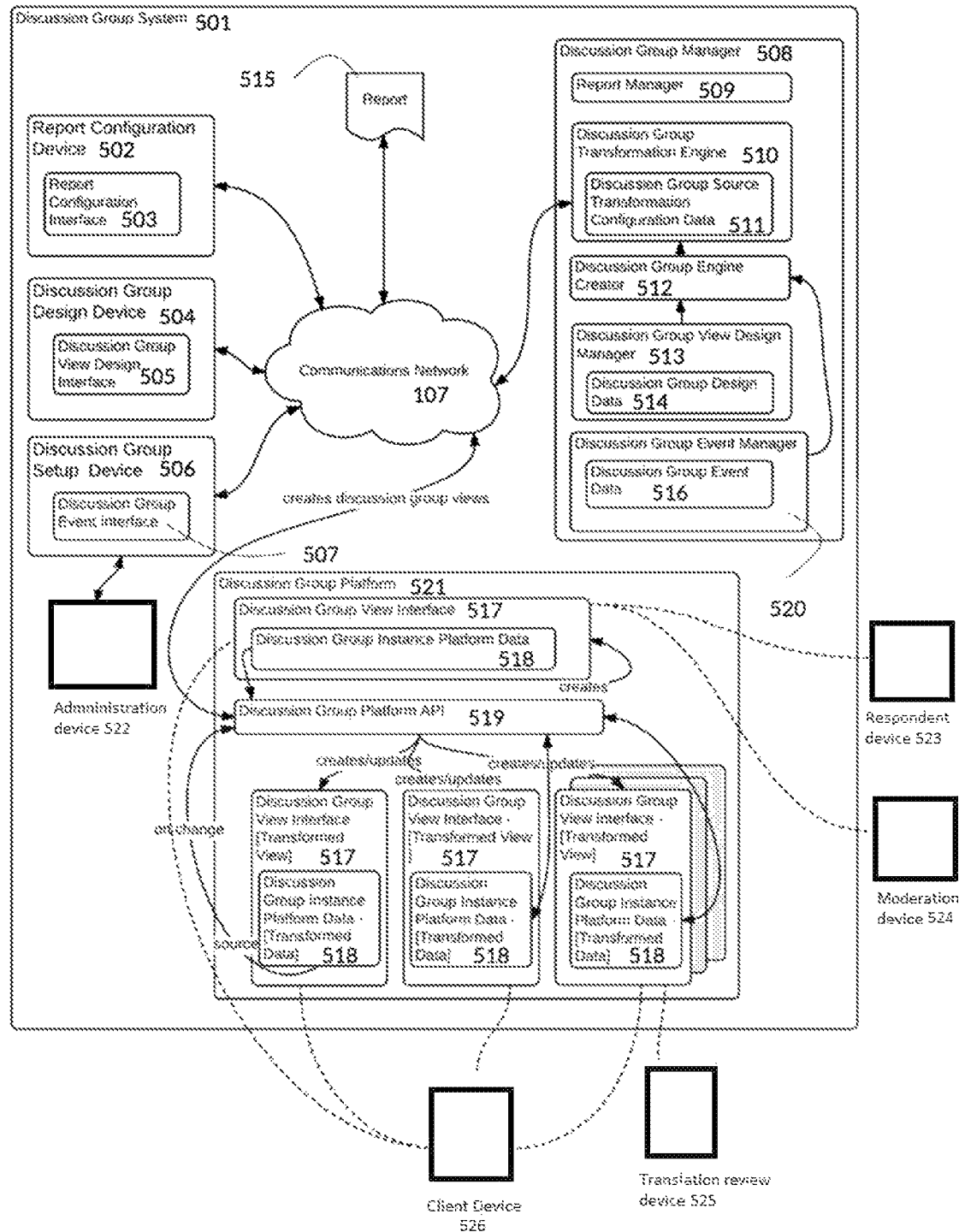
FIG. 5 is a block diagram illustrating an overall system layout, according to an embodiment of the invention.

Referring now to FIG. 5, which shows an overall system layout. Discussion group system 501 comprises a distributed computing network 307 that is operably connected to a communications network 107 for instantiation and real-time transformation of a discussion group resulting in different metadata derivation views of the discussion. Discussion group system 501 preferably comprises a discussion group setup device 506, discussion group design device 504, discussion group platform 521, discussion group manager 508, report configuration device 502, and report 515.

Report configuration device 502 comprises a computing device 101 that creates a report 515. Report configuration device 502 preferably comprises a report configuration interface 503.

Report configuration interface 503 comprises a graphical user interface that accepts report configuration data 1001. One goal of report configuration interface 503 may be to allow configuration of different types of report 515 for evaluation of a discussion group event. For example, downloadable reports, real time reports, and bucket related configurations for collecting and evaluation data.

Discussion group design device 504 comprises a computing device 101 that allows one to configure different types of discussion group and derive views based on the purpose of the discussion group. In some embodiments, if discussion group design device 504 is absent, then files, configuration documents, or programmatic instructions may be used to design a discussion group type. One goal of discussion group design device 504 may be to allow different types of conversational topics to have different transform views. For example, astronauts talking about space may have derived views that pull out aeronautical terms that can be presented to people at different education levels, all in one language. Another example may be, a focus group discussing a product where the derived views are in different languages, the languages each associated to a client device 526 and respondent device 523 and a derived view may be a translation view. Discussion group design device 504 preferably comprises a discussion group view design interface 505.

Discussion group view design interface 505 comprises a graphical user interface that accepts discussion group design data 514. One goal of discussion group view design interface 505 may be to allow one to configure different views and rules for transformations for different roles and participant types associated to user devices in a discussion group. For example, administration device 522 may configure three types of roles, young participants, senior participants, and relevant views, for an evaluation the different linguistics for discussing a product or topic. Discussion group view design interface 505 comprises a role configurator 801 and output view configurator 802. It should be appreciated that roles, as used herein, refer to roles of user devices registered with the system.

Discussion group setup device 506 comprises a computing device that allows a creation of an online discussion group. In some embodiments, if discussion group setup device 506 is absent, then discussion group event data 516 can be manually entered, configured, or captured for input into the discussion group system 501. Discussion group setup device 506 preferably comprises a discussion group event interface 507.

Discussion group event interface 507 comprises a graphical user interface that receives discussion group event data 516 on a computing device. One goal of discussion group event interface 507 may be to allow the input of discussion group event data 516. For example, an administration device 522 may interface to client device 526 and input required data parameters for creating a discussion group.

Discussion group manager 508 comprises a network connected computing device comprising a modules and/or submodules that implement algorithms, processes, data storage, or functions related to the management of a discussion group. Discussion group manager 508 preferably comprises a discussion group view design manager 513, discussion group event manager 520, report manager 509, discussion group engine creator 512, and discussion group transformation engine 510.

Report manager 509 comprises modules and/or submodules that mediate the conversion of report configuration data 1001 into a report 515 for a client device 526. Report manager 509 preferably comprises report configuration data 1001.

Discussion group transformation engine 510 comprises modules and/or submodules that allow event-based modification and transformation of content for a discussion group view interface 517. Discussion group transformation engine 510 functions to both: (1) allow for the creation of multiple discussion group view interface 517 on a discussion group platform 521 via the discussion group platform API 519 and to, (2) allow for the receiving of instance conversation data 704 from a first discussion group view interface 517 to act as a source for a second discussion group view interface 517 wherein the discussion group source interface display 902 displays newly transformed discussion group source data 702 from the first instance conversation data 704. Discussion group transformation engine 510 preferably comprises discussion group source transformation configuration data 511.

Discussion group source transformation configuration data 511 comprises a data object or configuration document that may be used to configure the discussion group source data 702 into a new discussion group view interface 517. One goal of discussion group source transformation configuration data 511 may be to allow transformation in real-time of particular content during a discussion into views of ancillary metadata or other derived content.

Discussion group engine creator 512 comprises modules and/or submodules that receive discussion group event data 516 and discussion group design data 514 in order to create the discussion group transformation engine 510 for the event-based modification and transformation of content for a discussion group view interface 517.

One goal of discussion group view design manager 513 may be to assign different views to different roles of associated user devices based on discussion group role data 613. Discussion group view design manager 513 preferably comprises discussion group design data 514.

Discussion group design data 514 comprises a data object that stores information related to the design of a type of discussion group event. For example, a collection of data that specifies three different types of roles and six different transform views for a discussion on cat breeding. Discussion group design data 514 comprises role configurator data 1101 and output view configurator data 1102.

Report 515 comprises a displayed document, interface, or presentation that has received discussion group data and preferably, as being configured to show particular topics of information as related to a client device 526. One goal of report 515 may be to allow the display of topics of interest associated to client device 526 that are selectively displayed based on interest. For example, in a discussion group on cats, client device 526 may display a report 515 on all the names of people who talked about cat scratch fever. Report 515 may have multiple alternative embodiments herein termed "real time report" embodiment, "real time note taking report" embodiment, and "downloadable file" embodiment.

Discussion group event data 516 comprises a data object that captures the parameters necessary for a discussion group conversation wherein the parameters discussed can be captured and filtered to a discussion group view interface 517. One goal of discussion group event data 516 may be to store information related to topics discussed in a discussion group. For example, John may talk about dogs and Jane may respond that she does not like dogs. Those data parameters may be captured for filtering to another view of the discussion. Discussion group event data 516 preferably comprises discussion guide document data 601, major subject areas data 604, demographic data 602, recruitment method data 609, client language data 603, time data 606, potential dates data 605, respondent language data 611, discussion group role data 613, social media platform data, and respondent count data 612.

Discussion group view interface 517 comprises a graphical user interface that receives discussion group instance platform data 518. One goal of discussion group view interface 517 may be to allow participants in a discussion group to interact with content that, in some embodiments, may have been transformed from original source content. Discussion group view interface 517 has multiple alternative embodiments herein termed "text sentiment analysis view" embodiment, "client view" embodiment, "moderator view" embodiment, "translation view" embodiment, "entity extraction view" embodiment, and "respondent view" embodiment. Discussion group view interface 517 preferably comprises a discussion group menu interface 901, instance conversation interface 904, and discussion group source interface display 902.

Discussion group instance platform data 518 comprises a data object for storing information as related to a particular view for a discussion group that has had zero or more transformation applied as related to its discussion group source data 702. For example, a discussion group instance view may have zero transforms and may be a moderator/respondent type of view. However, another discussion group instance view may take the preceding view and add a transform for a different language to be analyzed by a translation review device 525. Discussion group instance platform data 518 preferably comprises discussion group menu data 701, discussion group source data 702, and instance conversation data 704.

Discussion group platform API 519 comprises an application programming interface for configuring, retrieving, creating, updating, or deleting third party data on a discussion group platform 521. One goal of discussion group platform API 519 may be to allow the establishment of different discussion group views and subsequently, based on event triggers, update transformed content served from the discussion group transformation engine 510 into the specified views.

Discussion group event manager 520 comprises modules and/or submodules that implement the algorithms, processes, data storage, or functions related to the management of discussion group event. Discussion group event manager 520 preferably comprises discussion group event data 516.

Discussion group platform 521 comprises a convening platform used to convene a discussion group, such as Yammer™, and the like. The convening platform provides the necessary set of functionalities for the users to congregate and interact. Such functions provided by the convene platform may be offering a common meeting point (for example, a URL) for users to join, identifying other parties currently online and interacting with other parties (messaging, etc.). The convening platform may be using a communication and/or social media platform such as Yammer™, and the like, to facilitate with this interaction. One goal of discussion group platform 521 may be to provide a location to host a discussion group. For example, a discussion group may be hosted on the social media platform, Yammer™. Discussion group platform 521 preferably comprises a discussion group view interface 517, discussion group instance platform data 518, and discussion group platform API 519.

Administration device 522 may be associated to a user who may be responsible for setting up a discussion group. In some embodiments, administration device 522 may be associated to a recruiting user for recruiting participant devices. Respondent device 523 may be associated to a user who may be recruited to participate in a discussion group. In some embodiments, respondent device 523 may be associated to an expert (hereinafter, referred to as expert respondent device 523). Moderator device 524 may be associated to a user who may be responsible for presiding over the discussion group. Translation review device 525 may be associated to a user who may be responsible for analyzing and correcting the auto translated text generated by the system. Client device 526 may be associated to a user who requests a discussion group to gather information for a particular purpose or need.

Figure 6:
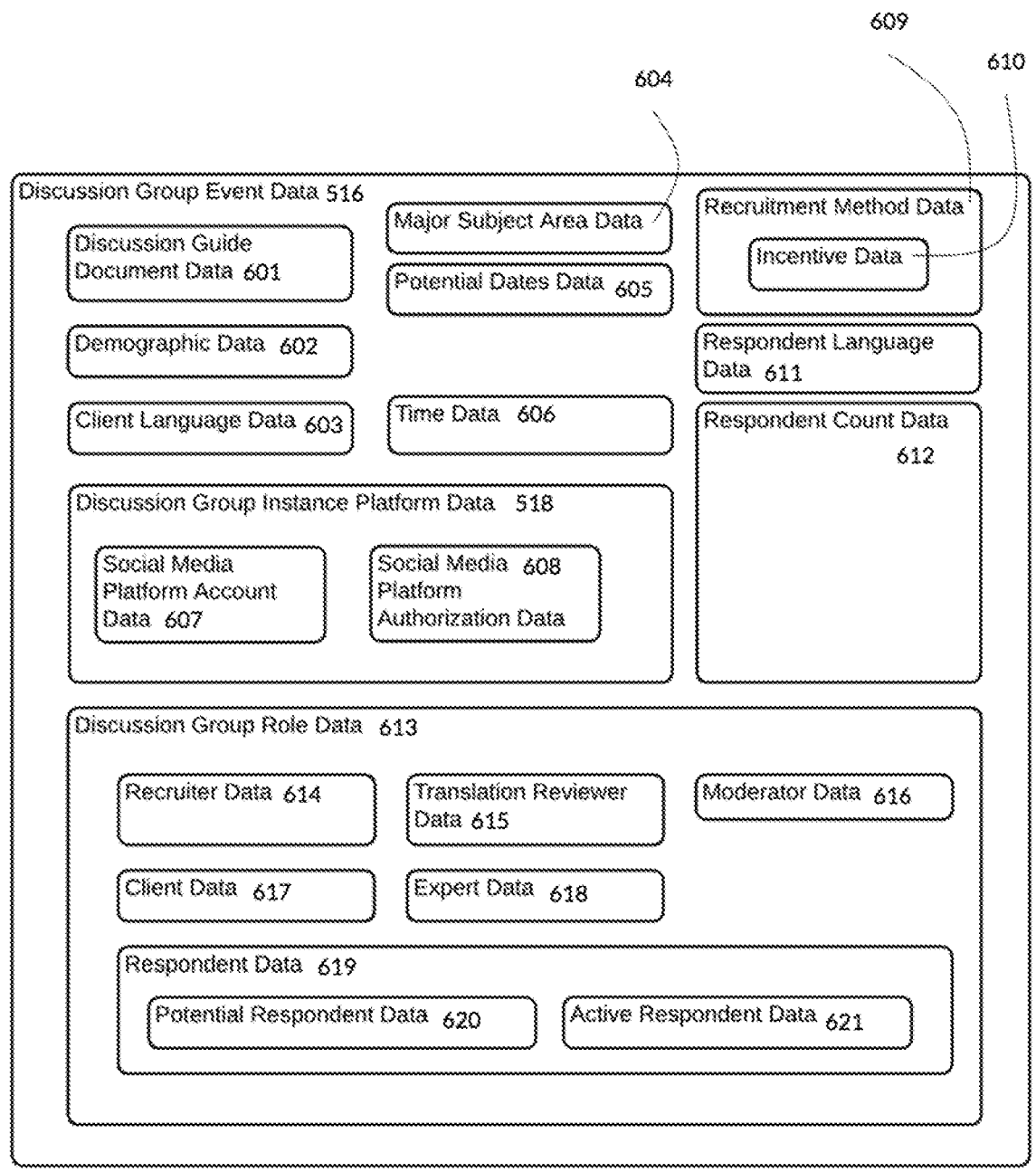
FIG. 6 is a block diagram illustrating a system diagram of discussion group event data objects and subobjects, according to an embodiment of the invention.

Referring now to FIG. 6, which shows a system diagram of discussion group event data objects and subobjects. Discussion guide document data 601 comprises a data object or information related to the topics in a discussion group that may be discussed. One goal of discussion guide document data 601 may be to set parameters for a user device to guide a discussion. For example, Bob is a moderator of a discussion group and aims to find out how the texture of a shirt feels with members of the group.

It should be appreciated that a user device may be used to describe any device 523-526 connected to the system. Participant, as used herein, refer to user devices connected to the system.

Demographic data 602 comprises a data object regarding which people should be in the discussion group. One goal of demographic data 602 may be to allow parameters of the people can give effective opinions regarding the topics. For example, children would be the ideal demographic for toys, whereas adults would be the ideal demographic for cars.

Client language data 603 comprises a data object that sets languages for a client device 526. One goal of client language data 603 may be to so that a client device 526 evaluating a discussion group can read it in the language of their choice. For example, Jose in Spain can evaluate the discussion in Spanish where Josue can evaluate it in Portuguese.

Major subject areas data 604 comprises a data object that captures the subject areas that may be covered in the discussion group. One goal of major subject areas data 604 may be to highlight the topics for all the people in the discussion group. For example, Jill notices that the discussion group may be on the following topics: dogs, dog collars, and dog leashes.

Potential dates data 605 comprises a data object regarding the date when the discussion group event may happen. One goal of potential dates data 605 may be to allow configuration of a date when the discussion group event may occur. For example, the discussion group event will begin on Tuesday, May 31st.

Time data 606 comprises a data object regarding the time when the discussion group event may happen. One goal of time data 606 may be to allow configuration of a time for the discussion group event to occur. For example, the discussion group event will begin at 5:00 PM EST.

Social media platform account data 607 comprises a data object that configures the host account on the discussion group platform 521 where the discussion group may take place. One goal of social media platform account data 607 may be to allow participants in a discussion group to have a central location where the account my take place. For example, each participant will have to be part of the discussion group system 501, and therefore, may need authentication to use the service.

Social media platform authorization data 608 comprises a data object that represents the unique association of the participant as being associated with the discussion group and allows the discussion group system 501 to mediate information associated with the account.

Recruitment method data 609 comprises a data object that sets up the parameters for recruitment, the ways that people are recruited. One goal of recruitment method data 609 may be to allow for the designation of the most effective means with which a user device designates an optimal way to gather people for the discussion group to have the most relevant input. For example, recruiting online is a more effective means for capturing programmers. Recruitment method data 609 preferably comprises incentive data 610.

Incentive data 610 comprises a data object that sets a compensation for respondent device 523 as incentive to participate. One goal of incentive data 610 may be to allow configuration of parameters so that a person can determine how much compensation to associate to respondent device 523. For example, while recruiting programmers, client device 526 may be willing to pay, for example, $5 but, when recruiting accountants, client device 526 may be willing to pay, for example, $25.

Respondent language data 611 comprises a data object that sets the language associated to respondent device 523. One goal of respondent language data 611 may be so that a respondent device 523 participating in a discussion group may display text in a language of their choice. For example, Eric in the US can evaluate the discussion in English where Michelle can evaluate it in French.

Respondent count data 612 comprises a data object that indicates the number of desired respondent devices 523. One goal of respondent count data 612 may be to allow the indication of the number of participating respondent device 523 in the discussion group. For example, Bob thinks that it may take at least 50 respondents to get a clear indication of whether the soles of the shoes are a valuable product before launching.

Discussion group role data 613 comprises a data object that designates appropriate roles associated to participant devices in a discussion group in order to run a discussion group effectively. One goal of discussion group role data 613 may be to assign roles in a discussion group. For example, Judy is associated to administration device 522 and Ernest is associate to client device 526. Discussion group role data 613 preferably comprises moderator data 616, client data 617, expert data 618, translation reviewer data 615, respondent data 619, and recruiter data 614.

Recruiter data 614 comprises a data object indicating a recruiter administration device 522 in a discussion group. In some embodiments, if recruiter data 614 is absent, then a discussion group event may continue without an associated recruiter administration device 522. One goal of recruiter data 614 may be to allow the system to designate a recruiter administration device 522 for the discussion group. For example, Bob is associated to recruiter administration device 522 associated to the discussion group.

Translation reviewer data 615 comprises a data object indicating an associated translation review device 525 in a discussion group. In some embodiments, if translation reviewer data 615 is absent, then a discussion group event may be configured without a translation review device 525. One goal of translation reviewer data 615 may be to allow a designation of a translation review device 525 for the discussion group. For example, Mary being selected as a translation review device 525 is prompted with system generated translation, then edits the system translation for a more correct language translation to be evaluated by client device 526. In some embodiments, a translation review device performs a machine translation and compares the results to the original translation.

Moderator data 616 comprises a data object indicating which moderator device 524 in a discussion group. One goal of moderator data 616 may be to allow the system to designate a moderator device 524 for the discussion group. For example, moderator device 524 uses the discussion guide document data 601 to steer the respondents for the purposes of client device 526 evaluation.

Client data 617 comprises a data object indicating which client devices 526 may be associated to a discussion group. For example, a client device 526 may ask for a discussion group event in order to review a product and would like to have, for example, seventy-five respondent devices 523 respond to questions posed by a moderator device 524 in order to evaluate the efficacy.

Expert data 618 comprises a data object indicating a respondent device 523 associated to an expert (that is, an expert respondent device 523) in a discussion group. In some embodiments, if expert data 618 is absent, then a discussion group event without a configure expert respondent device 523 may be configured. One goal of expert data 618 may be to allow the system to designate a respondent device 523 associated to an expert for the discussion group. For example, an expert, via an associated respondent device 523, may help design, with a client device 526 and administration device 522, the proper guides, recruitment, and setup for a discussion group event and may or may not react in real time with the event.

Respondent data 619 comprises a data object indicating which respondent device 523 are associated to a discussion group that in a preferred embodiment, may be later added to the discussion group event data 516 during recruitment. One goal of respondent data 619 may be to allow the system to designate a respondent device 523 for the discussion group. For example, respondent device 523 may be recruited according to the target demographics as evaluators of a topics in a discussion guide. Respondent data 619 comprises potential respondent data 620 and active respondent data 621.

Potential respondent data 620 comprises a data object indicating a plurality of potential respondent devices 523 in a discussion group. One goal of potential respondent data 620 may be to allow the system to designate a plurality of potential respondent devices 523 for the discussion group. For example, a potential respondent device 523 may be a user device that has been invited to a discussion group as a respondent device 523 but has not yet accepted the invitation.

Active respondent data 621 comprises a data object indicating which active respondent device 523 may be in a discussion group. One goal of active respondent data 621 may be to allow the system to designate an active respondent device 523 for the discussion group. For example, an active respondent device 523 is a respondent device 523 that has been invited as a potential respondent and has accepted the invitation.

Figure 7:
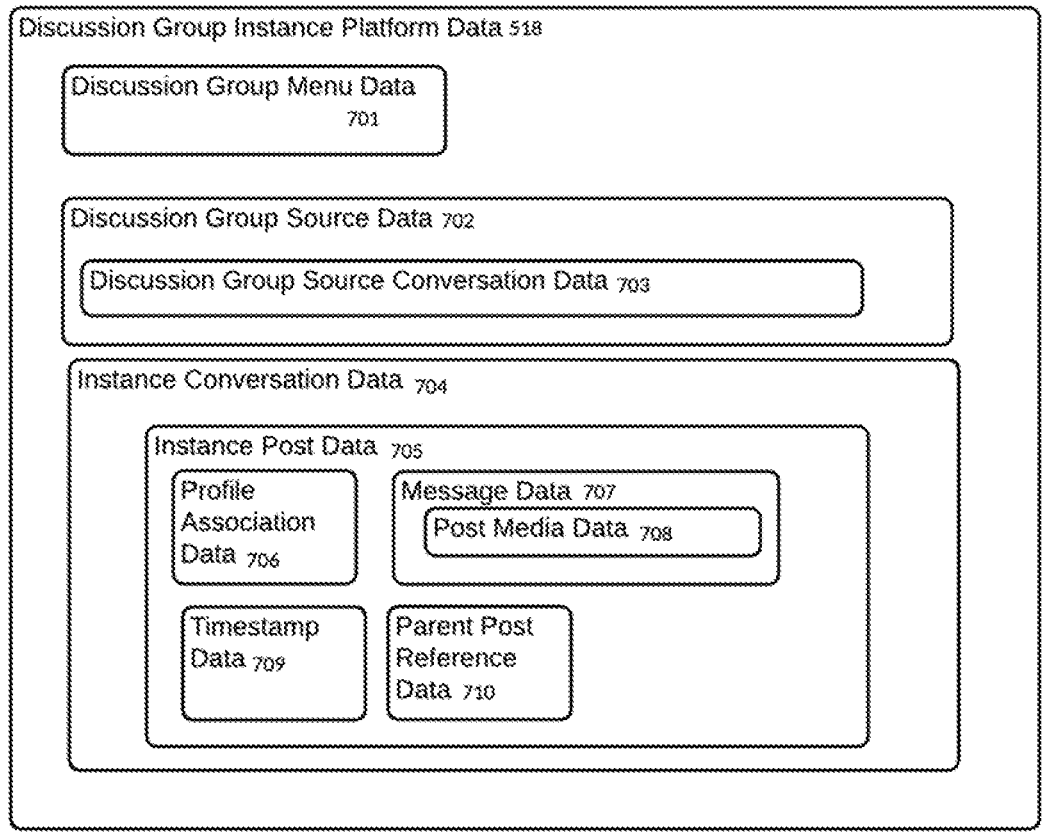
FIG. 7 is a block diagram illustrating a system diagram of discussion group instance platform data objects and subobjects, according to an embodiment of the invention.

Referring now to FIG. 7, which shows a system diagram of discussion group instance platform data objects and subobjects.

Discussion group menu data 701 comprises a data object that configures the types of discussion group view interface 517 that user device may toggle between. One goal of discussion group menu data 701 may be to allow a user device to evaluate multiple views that can have enhanced content based on derivations or metadata.

Discussion group source data 702 comprises a data object or stream that may be used for transforming content into a new discussion group view interface 517. One goal of discussion group source data 702 may be to allow a transformation of one particular discussion group view interface 517 into a different discussion group view interface 517 by providing source content. For example, a chat of a discussion about dogs can act as the source content wherein a transformation occurs and the particular types are only shown in the transformation discussion group view interface 517. Discussion group source data 702 preferably comprises discussion group source conversation data 703.

Discussion group source conversation data 703 comprises a data object that contains the source conversational data (which may be transformed) between participants in a discussion group view interface 517. One goal of discussion group source conversation data 703 may be to allow an evaluator client device 526 (that is, a client device 522 designated for evaluation) of the discussion group view interface 517 to see source instance conversation data 704 that may have been transformed such that new instance conversation data 704 can be added as metadata reflecting discussion regarding the source data. For example, a conversation thread about cats is imported from one view into a new view where the word "cat" has been transformed to be underlined in every post and this serves as the topics to which new conversational data can be added by participants.

Instance conversation data 704 comprises a data object that contains the conversational data between participants in a discussion group, which, in some embodiments, includes text, time stamps, orders, and replies to discussion group source conversation data 703. For example, transformed content can be imported into the view and new responses and conversations can be input as related to the source conversation. Instance conversation data 704 preferably comprises instance post data 705.

Instance post data 705 comprises a data object that reflects one post by one participant device, which, in some embodiments, includes media, text, and content. One goal of instance post data 705 may be to allow an assignation of a particular output as related to a person in a conversation, along with a time stamp for ordering and/or relevance. Instance post data 705 preferably comprises message data 707, profile association data 706, timestamp data 709, and parent post reference data 710.

Profile association data 706 comprises a data object that configures the input of a post to a particular individual.

Message data 707 comprises a data object that reflects the input content of a particular post as part of a chat or conversation by a profile. Message data 707 preferably comprises post media data 708.

Post media data 708 comprises a data object that includes media as related to a post. One goal of post media data 708 may be to allow the configuration of ancillary types of data, such as video, hyperlinks, audio, and streaming content to be associated with content that a participant says.

Timestamp data 709 comprises a data object that records the time of the message data 707. One goal of timestamp data 709 may be to allow a transformation to have ordered content of a particular post as part of a conversation, which may allow for derived content or transformation to occur.

Parent post reference data 710 comprises a data object that ties one post data to a parent post. In some embodiments, this may be a reply to a message.

Figure 8:
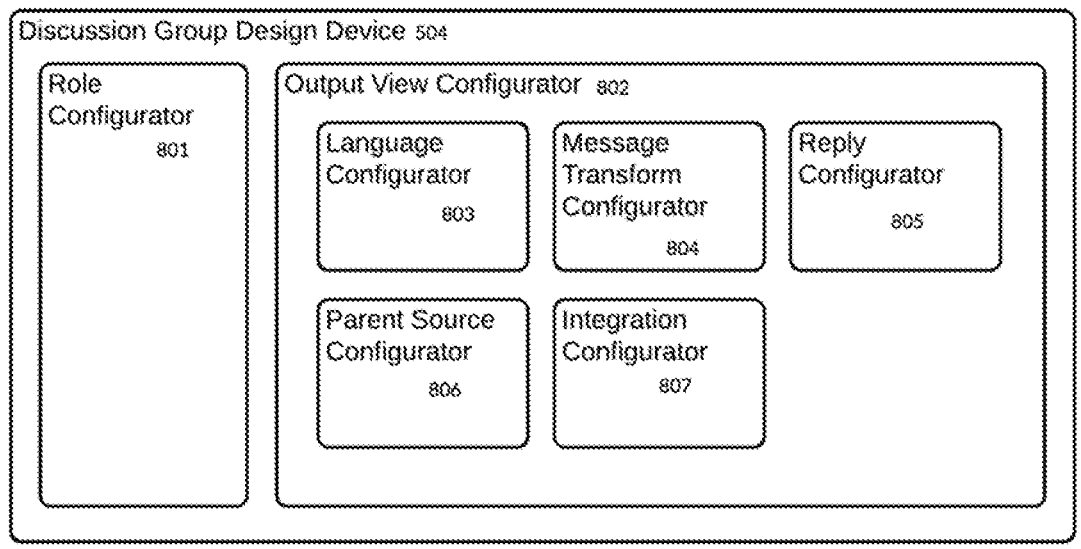
FIG. 8 is a block diagram illustrating a system diagram of discussion group design device modules and submodules, according to an embodiment of the invention.

Referring now to FIG. 8, which shows a system diagram of discussion group design device modules and submodules.

Role configurator 801 comprises an interface that accepts role configurator data 1101. One goal of role configurator 801 may be to allow the configuration of different types of roles that may be used for different types of discussion group event. For example, a discussion group may be designed for focus group testing and would comprise recruiter administration device 522, translation review device 525, moderator device 524, and respondent device 523, while another discussion group may be designed for education-level translation and may include moderator device 524, respondent device 523, and education expert respondent device 523 only.

Output view configurator 802 comprises an interface that accepts output view configurator data 1102. One goal of output view configurator 802 may be to allow the configuration of different view output types, which may include visual design, source data for transformation, language configurations, and message transformation. Output view configurator 802 preferably comprises a language configurator 803, message transform configurator 804, reply configurator 805, parent source configurator 806, and integrations configurator 807.

Language configurator 803 comprises an interface that accepts language configurator data 1103. One goal of language configurator 803 may be to allow a person to select languages for particular views.

Message transform configurator 804 comprises an interface that accepts message transform configurator data 1104. One goal of message transform configurator 804 may be to allow a designation of a type of transformation that may be applied to a message in a discussion group.

Reply configurator 805 comprises an interface that accepts reply configurator data 1105. One goal of reply configurator 805 may be to allow the configuration of how a person may reply to a message and the parameters associated with that display. For example, whether or not a reply to a message that may be visible to the person who created the message, or who that reply may be visible to.

Parent source configurator 806 comprises an interface that accepts parent source configurator data 1106. One goal of parent source configurator 806 may be to allow a configuration of a source of the data where a transformation may be applied to. For example, a chat discussion in English may be the source for a language transformation into Spanish.

Integrations configurator 807 comprises an interface that accepts integrations configurator data 1107. One goal of integrations configurator 807 may be to allow the configuration of different sources that are not parent sources, but are integrations that otherwise transform the content within a discussion group view.

Figure 9:
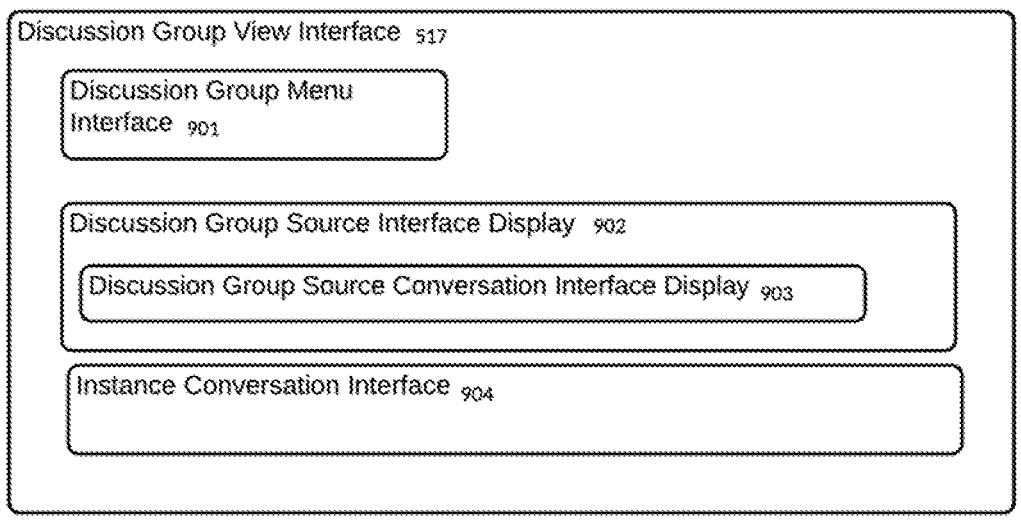
FIG. 9 is a block diagram illustrating a system diagram of discussion group view interface modules and submodules, according to an embodiment of the invention.

Referring now to FIG. 9, which shows a system diagram of discussion group view interface modules and submodules.

Discussion group menu interface 901 comprises a graphical user interface that receives discussion group menu data 701. One goal of discussion group menu interface 901 may be to allow a participant to toggle between different discussion group view interface 517 to evaluate the discussion group from multiple perspectives.

Discussion group source interface display 902 comprises a graphical user interface that displays the content of the data object or stream of a discussion group source data 702 that may have been transformed from another view's instance conversation data 704. Discussion group source interface display 902 preferably comprises a discussion group source conversation interface display 903.

Discussion group source conversation interface display 903 comprises a graphical user interface that displays the content of the data object or stream of a discussion group source conversation data 703 that preferably, has been transformed by the discussion group transformation engine 510.

Instance conversation interface 904 comprises a graphical user interface that receives instance conversation data 704 that allows for a user device to respond to a discussion group source conversation data 703. One goal of instance conversation interface 904 may be to allow participants in a conversation to interact and send content back and forth. Instance conversation interface 904 preferably comprises an instance post data interface.

Figure 10:
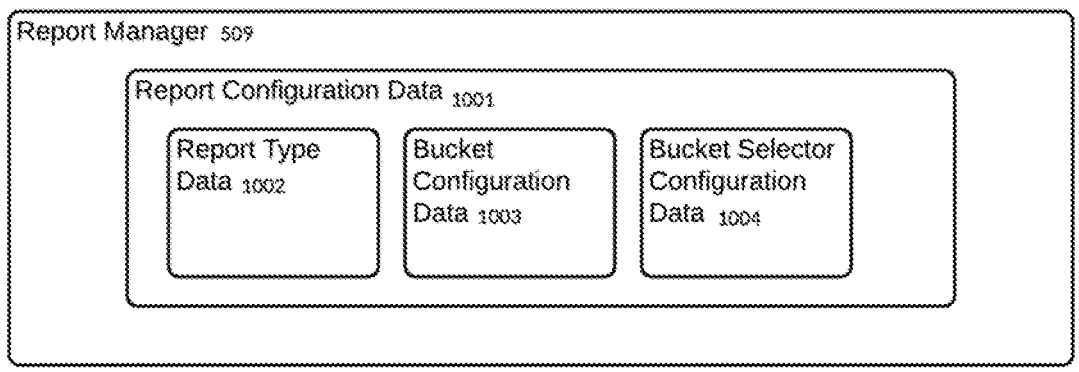
FIG. 10 is a block diagram illustrating a system diagram of report manager and its data objects and subobjects, according to an embodiment of the invention.

Referring now to FIG. 10, which shows a system diagram of report manager and its data objects and subobjects.

Report configuration data 1001 comprises a data object that configures a particular type of report 515 to a client device 526 based on the discussion group event data 516. For example, Bob might want spreadsheets for a report 515 and have these particular buckets available for tagging discussion group. Report configuration data 1001 preferably comprises report type data 1002, bucket configuration data 1003, and bucket selector configuration data 1004.

Report type data 1002 comprises a data object that configures a way to select the output of a report 515. In some embodiments, examples of report type data 1002 may include: .DOCX configuration data, spreadsheet configuration data, PDF configuration data, real-time configuration data, API configuration data, or real-time note taking configuration data.

Bucket configuration data 1003 comprises a data object that configures the association of a bucket to a type of bucket selector and label. For example, tagging the word "soccer" with a hashtag would be a bucket configuration that would allow any "#soccer" instances to signal the association of content to the "soccer" bucket.

Bucket selector configuration data 1004 comprises a data object that sets the semantic markup for tagging content as pertaining to a particular bucket. In some embodiments, examples of bucket selector configuration data 1004 may include: hashtag selector, keystroke selector, wrapping tag selector, handlebar selector, or token tag selector. One goal of bucket selector configuration data 1004 may be to allow for the creation of a markup notation that allows a configuration of tag content to be assigned to different report 515 buckets. For example, the hashtag "jungle" may be used to assign content to the "jungle" bucket where the hashtag may be a type of selector.

Figure 11:
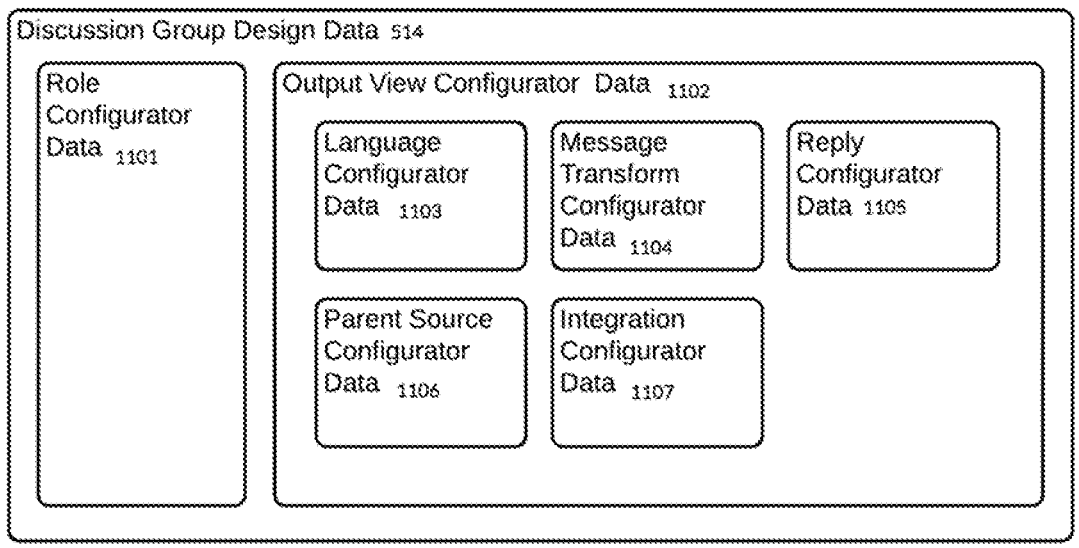
FIG. 11 is a block diagram illustrating a system diagram of discussion group design data objects and subobjects, according to an embodiment of the invention.

Referring now to FIG. 11, which shows a system diagram of discussion group design data objects and subobjects.

Role configurator data 1101 comprises a data object that allows one to define the roles for a particular type of discussion group event.

Output view configurator data 1102 comprises a data object that allows one to configure the outputs for particular views and the relationships between sources for relevant transformation between views. Output view configurator data 1102 preferably comprises message transform configurator data 1104, language configurator data 1103, parent source configurator data 1106, reply configurator data 1105, and integrations configurator data 1107.

Language configurator data 1103 comprises a data object that allows configuration of languages for particular views and establish the source and related transformation required.

Message transform configurator data 1104 comprises a data object that allows configuration of types of transformation of a particular message in a discussion group event. For example, messages may be transformed for semantic understanding, keyword collections, sentiment analysis, or language translation.

Reply configurator data 1105 comprises a data object that allows configuration of types of replies allowed in a particular view, where that may be visible or not visible, and whether that may be a source for other transformation.

Parent source configurator data 1106 comprises a data object that allows configuration of parent source for particular views and establish the source and related transformation required.

Integrations configurator data 1107 comprises a data object that allows configuration of imports of particular types of data into a view that may not necessarily be derived from a source view through a transformation. For example, a view may have a source view that is filtered to only show text with four characters and a second view as used as an integration for characterizing the frequency of those four characters as used in a given, for example English, language.

Figure 12A:
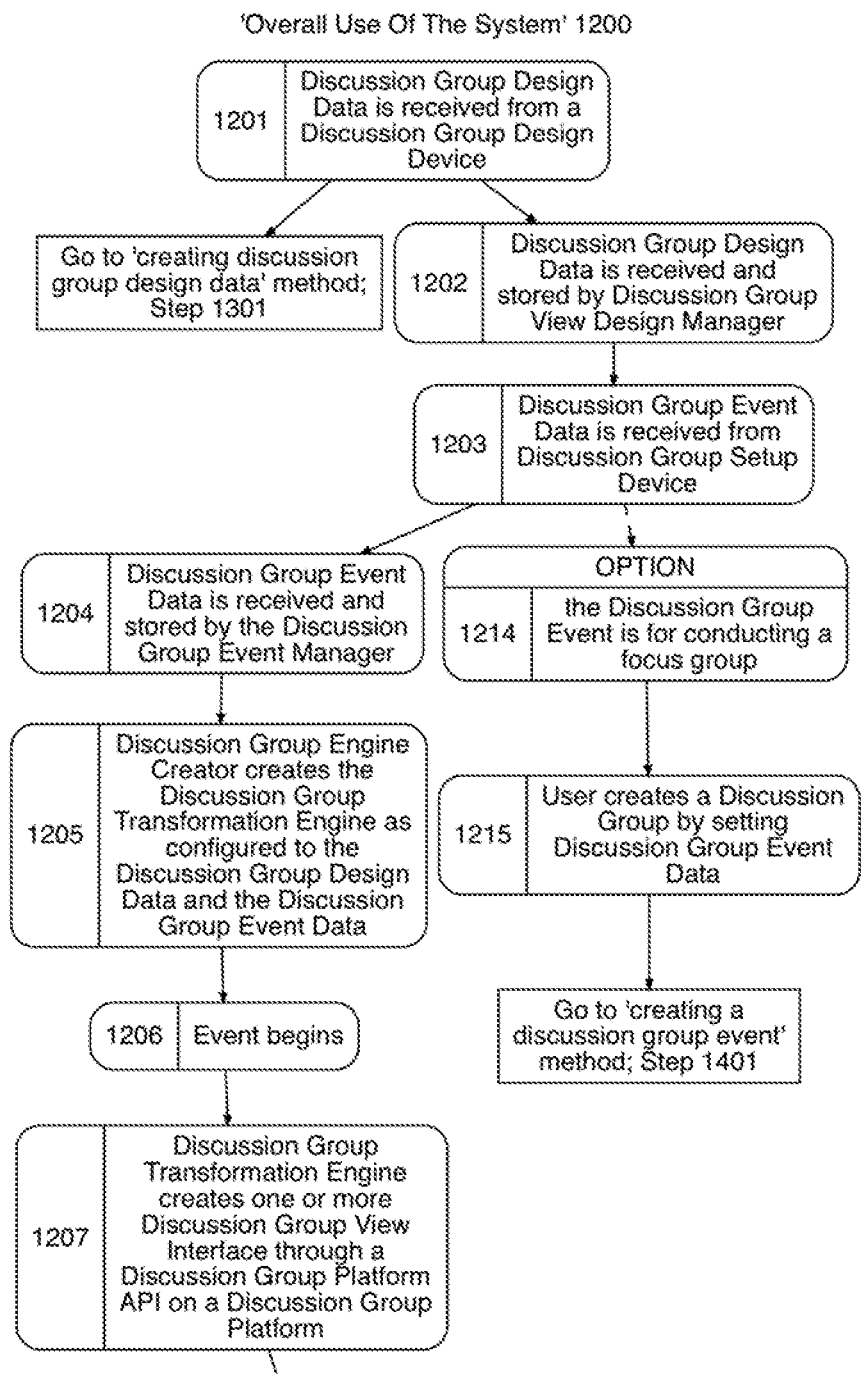
FIG. 12A and FIG. 12B are flow diagrams illustrating a method for an overall use of the system, according to an embodiment of the invention.
Figure 12B:
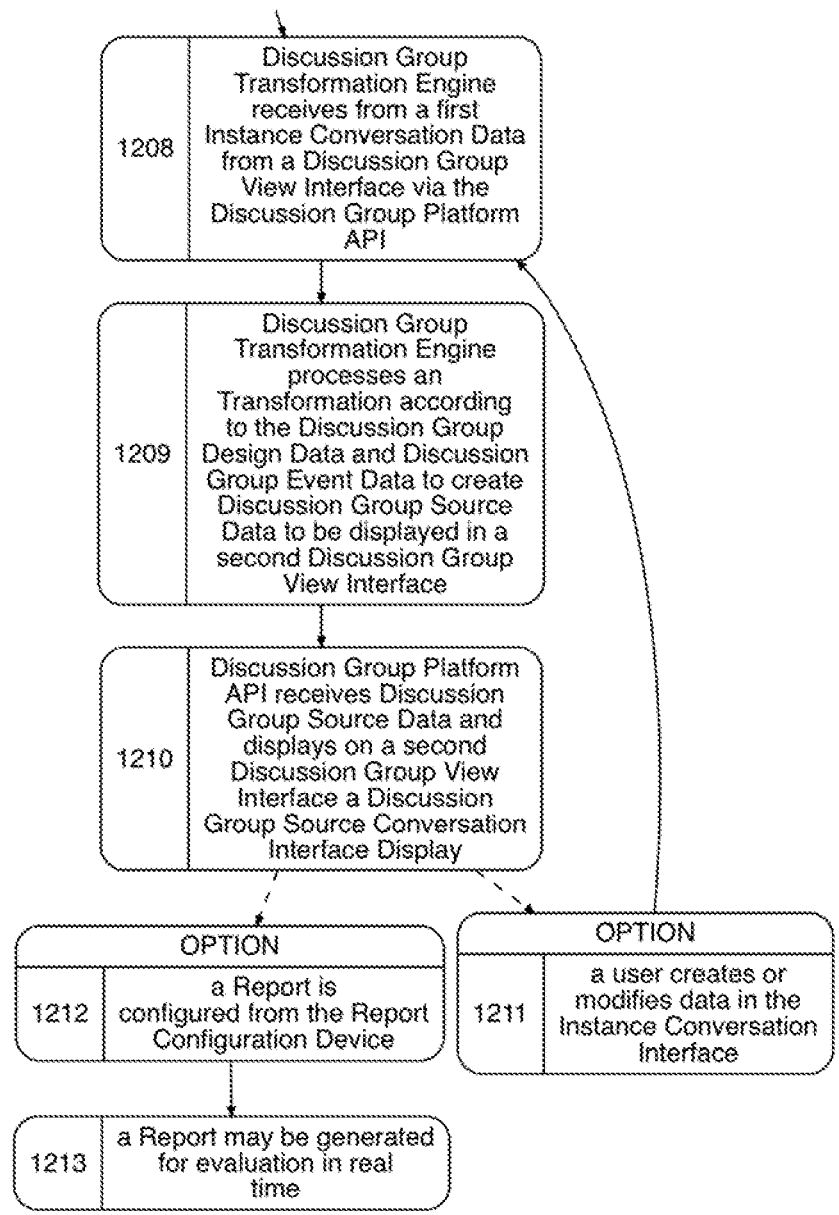

Referring now to FIG. 12A and FIG. 12B, which shows overall use of the system.

In a first step, discussion group design data 514 may be received from a discussion group design device 504 (Step 1201). Step 1201 is further detailed below in a related method (1300—'creating discussion group design data'). Next, discussion group design data 514 may be received and stored by discussion group view design manager 513 (Step 1202). Next, discussion group event data 516 may be received from discussion group setup device 506 (Step 1203). Next, discussion group event data 516 may be received and stored by the discussion group event manager 520 (Step 1204). Next, discussion group engine creator 512 creates the discussion group transformation engine 510 as configured to the discussion group design data 514 and the discussion group event data 516 (Step 1205). Next, Event begins (Step 1206). Next, discussion group transformation engine 510 creates a discussion group view interface 517 through a discussion group platform API 519 on a discussion group platform 521 (Step 1207). Next, discussion group transformation engine 510 receives from a first instance conversation data 704 from a discussion group view interface 517 via the discussion group platform API 519 (Step 1208). Next, discussion group transformation engine 510 processes a transformation according to the discussion group design data 514 and discussion group event data 516 to create discussion group source data 702 to be displayed in a second discussion group view interface 517 (Step 1209). Next, discussion group platform API 519 receives discussion group source data 702 and displays, on a second discussion group view interface 517, discussion group source conversation interface display 903 (Step 1210). If a user creates or modifies data in the instance conversation interface 904 (Step 1211), then refer to Step 1208. From Step 1210, if a report 515 is configured from the report configuration device 502 (Step 1212), then a report 515 may be generated for evaluation in real time (Step 1213). From Step 1203, if the discussion group event is for conducting a focus group (Step 1214), then User creates a discussion group by setting discussion group event data 516 (Step 1215). Step 1215 is further detailed below in a related method (1400—'creating a discussion group event').

Figure 13:
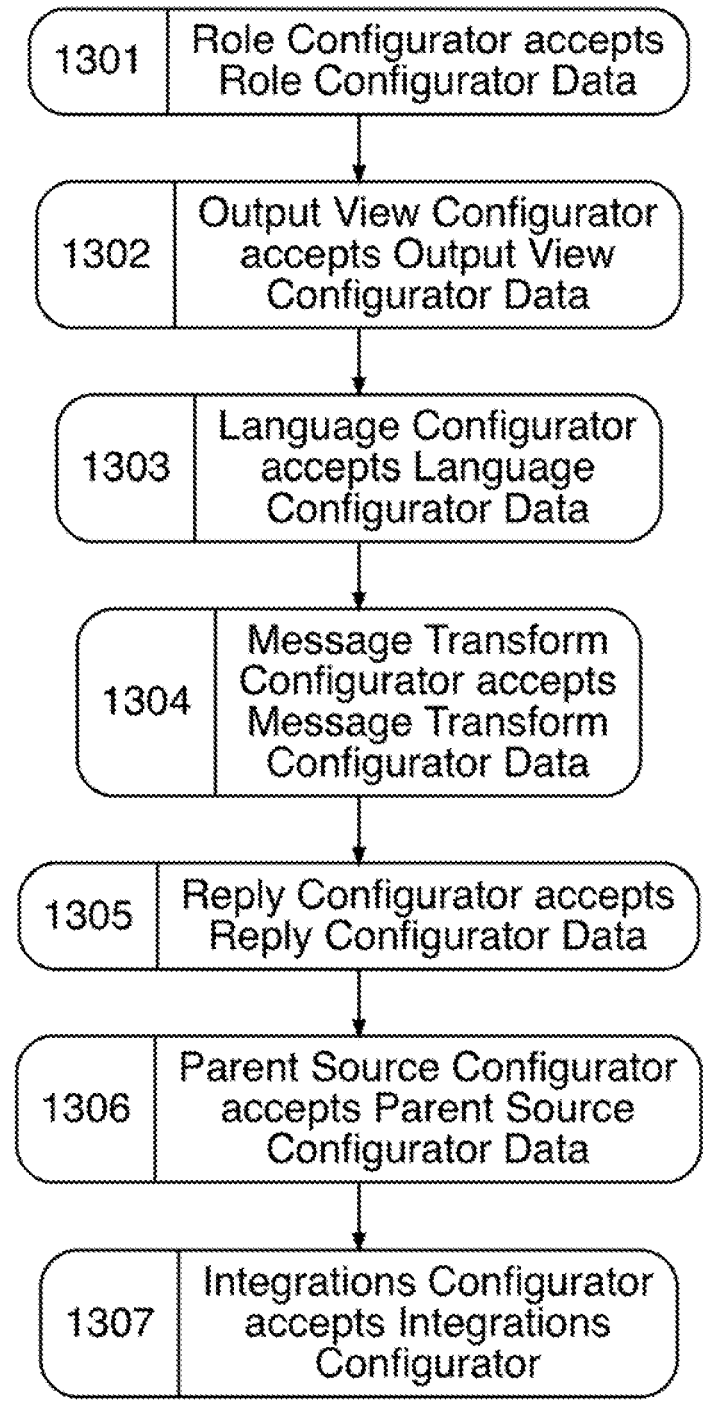
FIG. 13 is a flow diagram illustrating a method for creating discussion group design data, according to an embodiment of the invention.

Referring now to FIG. 13, which shows creating discussion group design data.

In a first step, role configurator 801 accepts role configurator data 1101 (Step 1301). Next, output view configurator 802 accepts output view configurator data 1102 (Step 1302). Next, language configurator 803 accepts language configurator data 1103 (Step 1303). Next, message transform configurator 804 accepts message transform configurator data 1104 (Step 1304). Next, reply configurator 805 accepts reply configurator data 1105 (Step 1305). Next, parent source configurator 806 accepts parent source configurator data 1106 (Step 1306). Next, integrations configurator 807 accepts integrations configurator 807 (Step 1307).

Figure 14A:
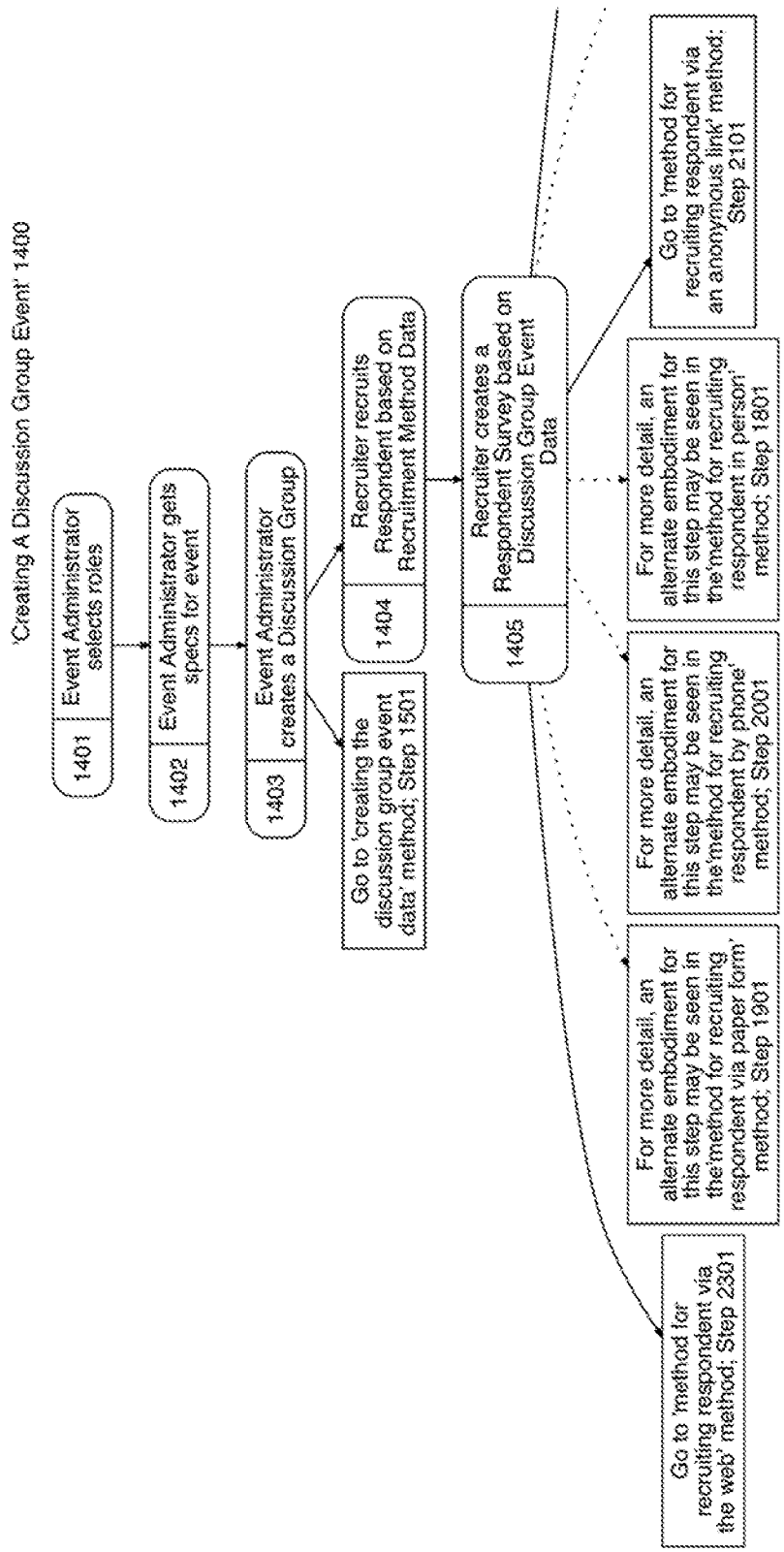
FIG. 14A and FIG. 14B are flow diagrams illustrating a method for creating a discussion group event, according to an embodiment of the invention.
Figure 14B:
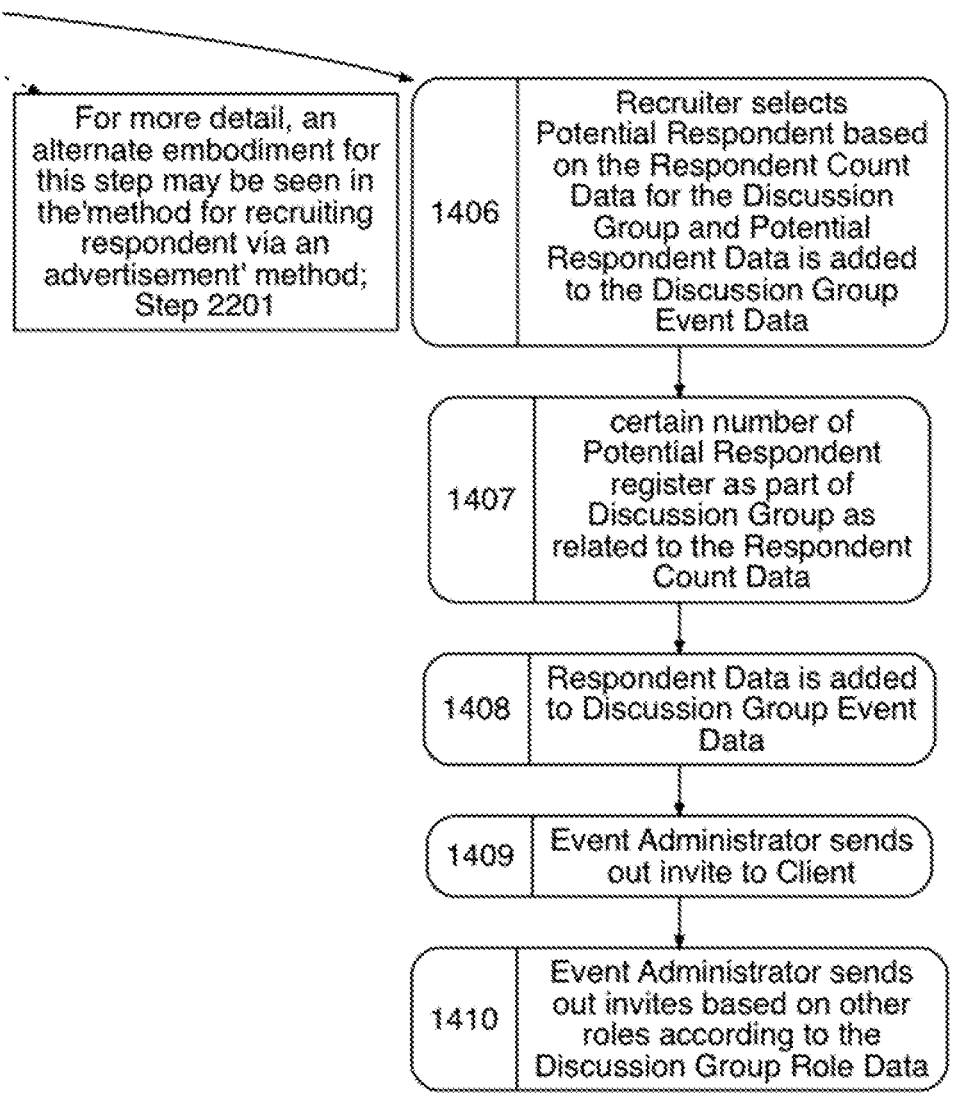

Referring now to FIG. 14A and FIG. 14B, which shows creating a discussion group event. In a first step, administration device 522 selects roles (Step 1401). Next, administration device 522 gets specs for event (Step 1402). Next, administration device 522 creates a discussion group (Step 1403). Step 1403 is further detailed below in a related method (1500—'creating the discussion group event data'). Next, a recruiter administration device 522 may recruit one or more respondent device 523 based on recruitment method data 609 (Step 1404). Next, recruiter administration device 522 creates a respondent survey based on discussion group event data 516 (Step 1405). Step 1405 is further detailed below in a related method (2300—'method for recruiting respondent via the web'). Next, recruiter administration device 522 may select one or more potential respondent devices 523 based on the respondent count data 612 for the discussion group and potential respondent data 620 may be added to the discussion group event data 516 (Step 1406). Next, certain number of potential respondent devices 523 register as part of discussion group as related to the respondent count data 612 (Step 1407). Next, respondent data 619 may be added to discussion group event data 516 (Step 1408). Next, administration device 522 sends out invite to client device 526 (Step 1409). Next, administration device 522 sends out invites based on other roles according to the discussion group role data 613 (Step 1410). Next, refer to Step 1401.

Figure 15A:
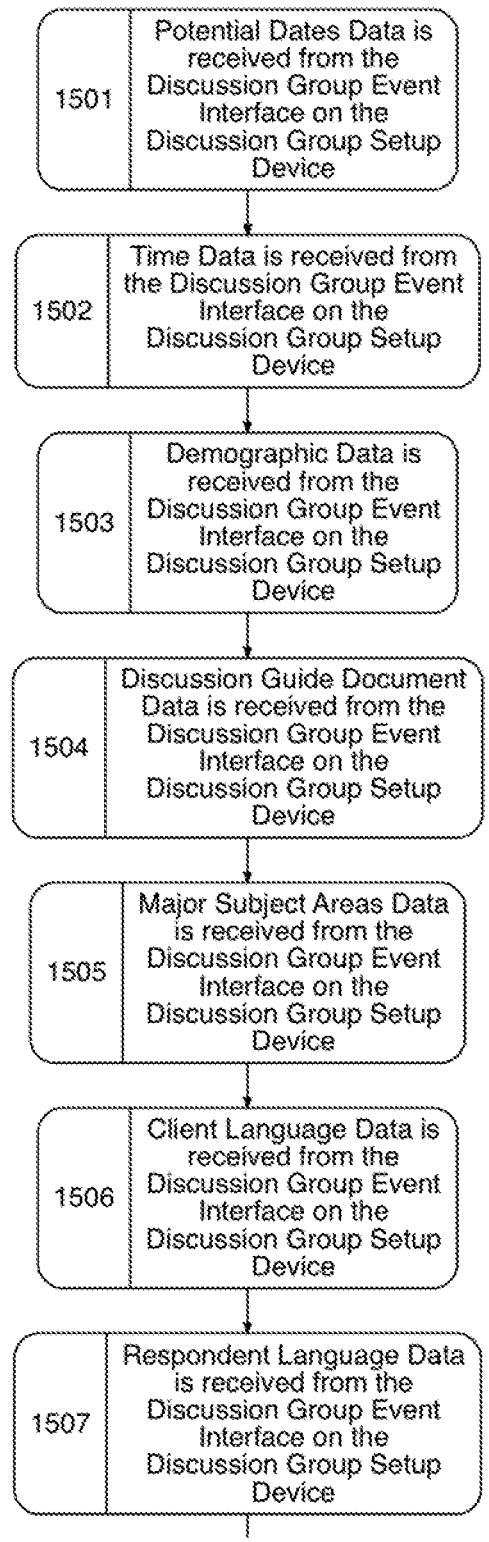
FIG. 15A and FIG. 15B are flow diagrams illustrating a method for creating the discussion group event data, according to an embodiment of the invention.
Figure 15B:
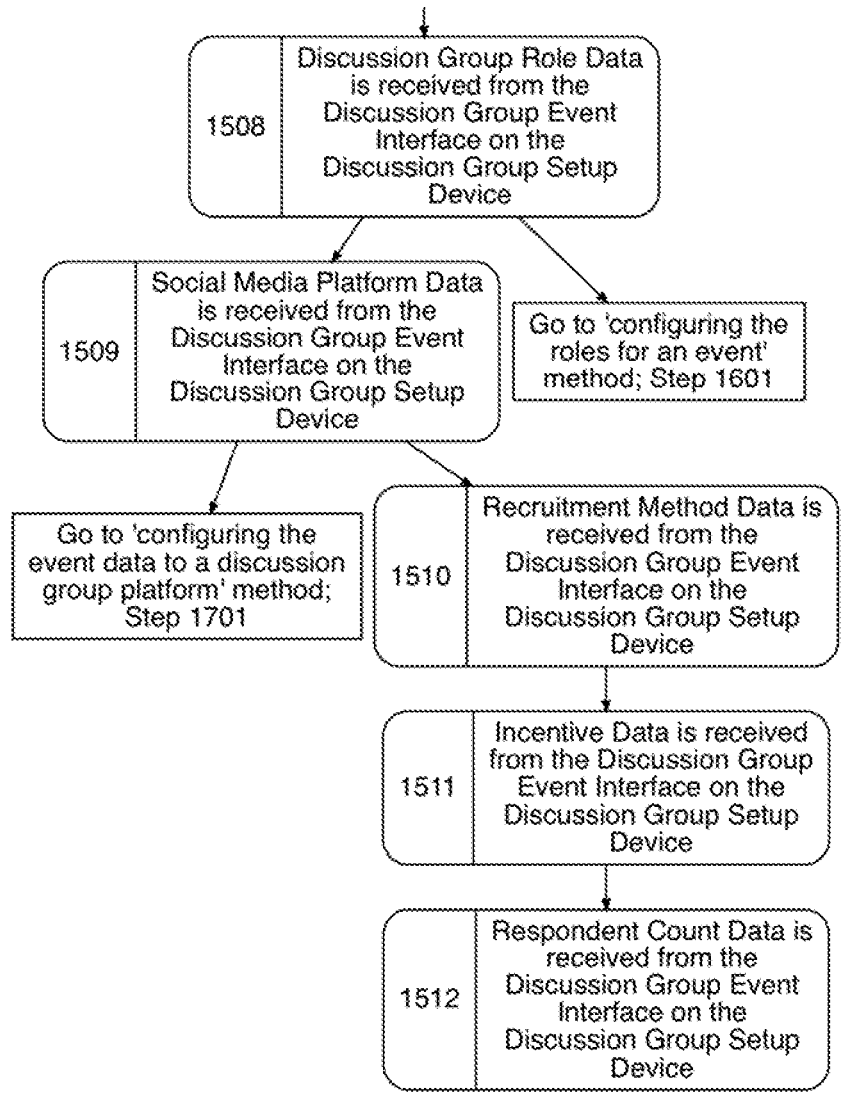

Referring now to FIG. 15A and FIG. 15B, which shows creating the discussion group event data.

In a first step, potential dates data 605 may be received from the discussion group event interface 507 on the discussion group setup device 506 (Step 1501). Next, time data 606 may be received from the discussion group event interface 507 on the discussion group setup device 506 (Step 1502). Next, demographic data 602 may be received from the discussion group event interface 507 on the discussion group setup device 506 (Step 1503). Next, discussion guide document data 601 may be received from the discussion group event interface 507 on the discussion group setup device 506 (Step 1504). Next, major subject areas data 604 may be received from the discussion group event interface 507 on the discussion group setup device 506 (Step 1505). Next, client language data 603 may be received from the discussion group event interface 507 on the discussion group setup device 506 (Step 1506). Next, respondent language data 611 may be received from the discussion group event interface 507 on the discussion group setup device 506 (Step 1507). Next, discussion group role data 613 may be received from the discussion group event interface 507 on the discussion group setup device 506 (Step 1508). Step 1508 may be further detailed below in a related method (1600—'configuring the roles for an event'). Next, social media platform data may be received from the discussion group event interface 507 on the discussion group setup device 506 (Step 1509). Step 1509 is further detailed below in a related method (1700—'configuring the event data to a discussion group platform'). Next, recruitment method data 609 may be received from the discussion group event interface 507 on the discussion group setup device 506 (Step 1510). Next, incentive data 610 may be received from the discussion group event interface 507 on the discussion group setup device 506 (Step 1511). Next, respondent count data 612 may be received from the discussion group event interface 507 on the discussion group setup device 506 (Step 1512).

Figure 16:
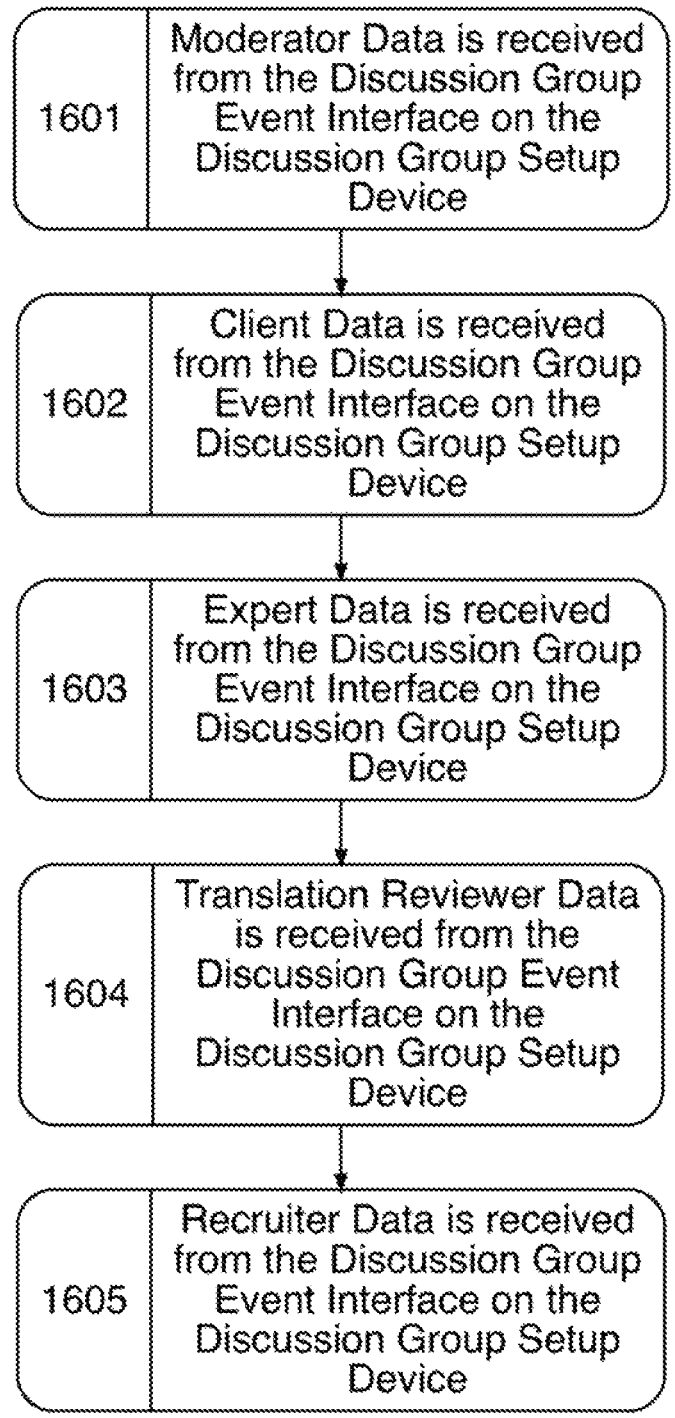
FIG. 16 is a flow diagram illustrating a method for configuring the roles for an event, according to an embodiment of the invention.

Referring now to FIG. 16, which shows configuring the roles for an event. In a first step, moderator data 616 may be received from the discussion group event interface 507 on the discussion group setup device 506 (Step 1601). Next, client data 617 may be received from the discussion group event interface 507 on the discussion group setup device 506 (Step 1602). Next, expert data 618 may be received from the discussion group event interface 507 on the discussion group setup device 506 (Step 1603). Next, translation reviewer data 615 may be received from the discussion group event interface 507 on the discussion group setup device 506 (Step 1604). Next, recruiter data 614 may be received from the discussion group event interface 507 on the discussion group setup device 506 (Step 1605).

Figure 17:
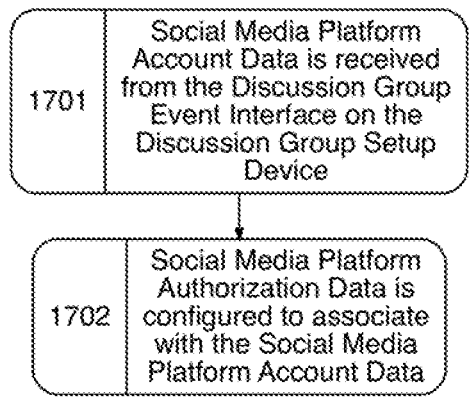
FIG. 17 is a flow diagram illustrating a method for configuring the event data to a discussion group platform, according to an embodiment of the invention.

Referring now to FIG. 17, which shows configuring the event data to a discussion group platform. In a first step, social media platform account data 607 may be received from the discussion group event interface 507 on the discussion group setup device 506 (Step 1701). Next, social media platform authorization data 608 may be configured to associate with the social media platform account data 607 (Step 1702).

Figure 18:
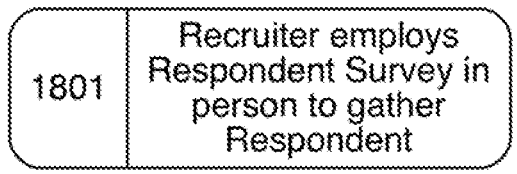
FIG. 18 is a flow diagram illustrating a method for recruiting respondent in person, according to an embodiment of the invention.

Referring now to FIG. 18, which shows method for recruiting respondent in person. In a first step, recruiter administration device 522 may employ a respondent survey to gather responses from respondent device 523 (Step 1801).

Figure 19:
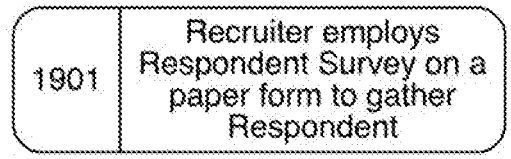
FIG. 19 is a flow diagram illustrating a method for recruiting respondent via paper form, according to an embodiment of the invention.

Referring now to FIG. 19, which shows method for recruiting respondent via paper form. In a first step, recruiter administration device 522 may employ a respondent survey on, for example, a scanned paper form (not shown) to gather responses from respondent device 523 (Step 1901).

Figure 20:
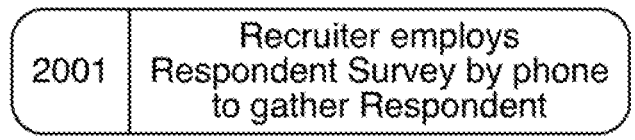
FIG. 20 is a flow diagram illustrating a method for recruiting respondent by phone, according to an embodiment of the invention.

Referring now to FIG. 20, which shows method for recruiting respondent by phone. In a first step, recruiter administration device 522 may employ a respondent survey, for example, by phone to gather audio reposes via automatic speaker recognition (not shown) from respondent device 523 (Step 2001).

Figure 21:
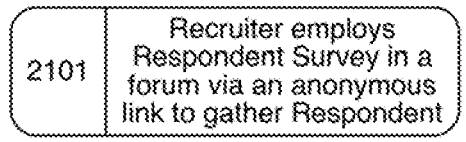
FIG. 21 is a flow diagram illustrating a method for recruiting respondent via an anonymous link, according to an embodiment of the invention.

Referring now to FIG. 21, which shows method for recruiting respondent via an anonymous link. In a first step, recruiter administration device 522 may employ a respondent survey in a forum via an anonymous link to gather responses from respondent device 523 (Step 2101).

Figure 22:
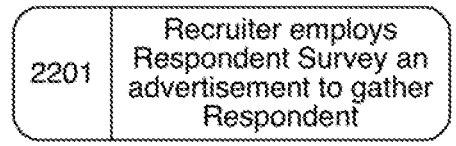
FIG. 22 is a flow diagram illustrating a method for recruiting respondent via an advertisement, according to an embodiment of the invention.

Referring now to FIG. 22, which shows method for recruiting respondent via an advertisement. In a first step, recruiter administration device 522 may employ a respondent survey, for example, as an advertisement, to gather responses from respondent device 523 (Step 2201).

Figure 23:
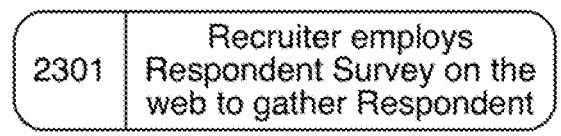
FIG. 23 is a flow diagram illustrating a method for recruiting respondent via the web, according to an embodiment of the invention.

Referring now to FIG. 23, which shows method for recruiting respondent via the web. In a first step, recruiter administration device 522 employ a respondent survey, for example by an online web form, to gather responses from respondent device 523 (Step 2301).

The following elements and terms: social media platform data, "client view" embodiment, "moderator view" embodiment, "translation view" embodiment, "text sentiment analysis view" embodiment, "entity extraction view" embodiment, "real time report" embodiment, "real time note taking report" embodiment, "downloadable file" embodiment, instance post data interface, "respondent view" embodiment, event administrator, recruiter, screener, moderator, expert, translation reviewer, client, respondent, potential respondent, active respondent, discussion group, discussion group event, respondent survey, transformation, and bucket, are important for the working functionality, but do not appear in the drawings and are shown below.

Social media platform data comprises a data object that configures the discussion group platform 521 and its associated features for hosting the discussion group. One goal of social media platform data may be to allow the setting of discussion group parameters. For example, setting up a discussion group on Yammer instead of Facebook. Social media platform data comprises social media platform account data 607 and social media platform authorization data 608.

Client view comprises an embodiment wherein a client device 526 has access to multiple views and potential data relating to the evaluation and discussion of the moderator device 524 led conversation.

Moderator view comprises an embodiment wherein a moderator device 524 has access to multiple views and potential data relating to guiding of the discussion and potential interaction with client device 526 and expert vis an associated respondent device 523, for helping to moderate the event.

Translation view comprises an embodiment wherein a transformation of the original discussion group data has been translated into a different language and translation review device 525 edits or modifies the translation in real time for greater accuracy. Further, this edited translation can be viewed by other participants of the discussion group.

Text sentiment analysis view comprises an embodiment wherein a transformation of the original discussion group data has been analyzed for the discovery and correlation of sentiments expressed in posts and/or conversation for evaluation.

Entity extraction view comprises an embodiment wherein a transformation of the original discussion group data has been filtered for the discovery of entities of interest. For example, a transformation may allow keywords to be identified and extracted from the data and presented in this view.

Real time report comprises an embodiment of a report 515 wherein discussion group data may be sent to a computing device 101 in real time for evaluation of specific parameters desired by a viewer. For example, an API may be established such that a push protocol is enacted to push data to a particular website for real time viewing of data visible on the website.

Real time note taking report comprises an embodiment of a report 515 wherein discussion group data may be sent to a computing device 101 in real time to a specific note taking interface for evaluation of specific parameters desired by a viewer. For example, an API may be established such that a push protocol is enacted to push data to a Google Docs document in real time.

Downloadable file comprises an embodiment of a report 515 wherein discussion group data may be created as a file for evaluation of specific parameters desired by a viewer. For example, a PDF, .DOCX file, or an image may be generated for a viewer.

Instance post data interface comprises a graphical user interface that receives instance post data 705. One goal of instance post data interface 705 may be to allow creation of a post as reflected in the topic of the conversation of the discussion group source conversation data 703.

Respondent view comprises an embodiment wherein responses from a respondent device 523 may be contributing to a discussion group conversation led by a moderator device 524.

The event administrator comprises a user who may be responsible for setting up a Discussion Group.

The recruiter administration device 522 may be associated to a user who may be responsible for recruiting participants for the Discussion Group.

The screener comprises a user who may be responsible for screening Potential Respondent and vetting their qualifications to participate in a Discussion Group.

The moderator comprises a user who may be responsible for presiding over the Discussion Group.

An expert respondent device 523 may be associated to a user who may be selected to participate in a Discussion Group because of their expertise and knowledge of a particular topic.

A translation review device 525 may be associated to a user who may be responsible for analyzing and correcting the auto translated text generated by the system.

A client device 526 may be associated to a user who requests a Discussion Group to gather information for a particular purpose or need.

A respondent device 523 may be associated to a user who may be recruited to participate in a Discussion Group.

A potential respondent device 523 may be associated to a user who may participate in a Discussion Group, but who may not yet be confirmed as participating.

The active respondent device 523 may be associated to a user who has been confirmed as participating in a Discussion Group and may be actively participating.

The discussion group comprises a forum that may be convened online in a Discussion Group Platform.

The discussion group event comprises an instance of a Discussion Group on a Discussion Group Platform.

The respondent survey comprises assessment questionnaire where responses are received from a potential respondent device 523.

The transformation comprises a way to convert a set of data values from the data format of a source data system into the data format of a destination data system.

The bucket comprises identified grouping or label of a topic that can be configured to associate with data in the Discussion Group System. For example, a "lions" bucket would be accessible to the user as a tag and content tagged with that label would be associated with the "lion" Bucket.

What is claimed is:

1. A discussion group system comprising:
   a network-connected discussion group server comprising a memory and a processor and further comprising programmable instructions stored in the memory and operating on the processor, the instructions when executed by the processor, cause the processor to:
   receive a plurality of connection from a plurality of user devices, each user device associated with a plurality of metadata;
   receive a plurality of content, the content corresponding to a plurality of topics from one or more pre-configured discussion groups;
   transform, in real-time, the at least portion of the plurality of content into transformed content, the transformed content resulting in different metadata-based derivation views of the at least a portion of the plurality of content based on a type associated to a first user device, of the plurality of user devices;

create a discussion group view interface via a discussion group platform Application Programming Interface (API), the plurality of discussion group interfaces comprising instance conversation data based on the transformed content, the discussion group interface associated with the first user device;
send the transformed content to the discussion group interface;
wherein the discussion group platform API is operable to:
process one or more event triggers on the discussion group platform, send transformed content;
establish different discussion group views;
update the transformed content;
wherein a first discussion group interface, of a plurality of discussion group view interfaces, comprises a discussion group menu interface operable to receive discussion group instance platform data;
wherein the first discussion group view interface further comprises one or more discussion group source interface displays operable to display content of a data object, the data object comprising a stream of a discussion group source data transformed from another view's instance conversation data;
wherein the one or more discussion group source interface displays comprises one or more discussion group source conversation interface displays;
wherein the one or more discussion group source conversation interface displays display content of the data object or stream of a discussion group source conversation data that has been transformed;
wherein the first discussion group view interface further comprises one or more instance conversation interfaces;
wherein the one or more instance conversation interfaces receive instance conversation data;
wherein the one or more instance conversation interfaces further comprise one or more instance post data interface;
wherein the one or more instance post data interface receives instance post data;
wherein a discussion group event manager comprises discussion group event data comprising a data object comprising parameters necessary for a discussion group conversation; and
wherein the parameters can be captured and filtered to one or more discussion group view interfaces of the plurality of discussion group view interfaces.

2. The system of claim 1, wherein the discussion group event data comprises one or more discussion group role data comprising a data object that designates a plurality of roles.

3. The system of claim 2, wherein the discussion group role data comprises one or more respondent data, the one or more respondent data comprising a data object indicating who is a respondent in a discussion group that is later added to the discussion group event data during recruitment.

4. The system of claim 3, wherein the discussion group role data further comprises one or more client data, the client data further comprising a data object indicating a client in a discussion group, the discussion group comprising the discussion group conversation.

5. The system of claim 4, wherein the discussion group role data further comprises moderator data, the moderator data further comprising a data object indicating a moderator device in a discussion group.

6. The system of claim 5, wherein the discussion group role data further comprises translation reviewer data, the translation reviewer data comprising a data object indicating a translation reviewer device in the discussion group.

7. The system of claim 6, wherein the respondent data comprises potential respondent data, the potential respondent data comprising a data object indicating a potential respondent device in the discussion group.

8. The system of claim 7, wherein the respondent data further comprises active respondent data comprising a data object indicating an active respondent device in the discussion group.

9. The system of claim 8, wherein the discussion group event data comprises social media platform data, the one or more social media platform data comprising a data object that configures the discussion group platform and its associated features for hosting the discussion group.

10. The system of claim 9, wherein the discussion group event data comprises one or more discussion guide document data, the one or more discussion guide document data comprising a data object related to topics in the discussion group.

11. The system of claim 10, wherein the discussion group event data further comprises respondent language data, the one or more respondent language data comprising a data object that sets the language for the respondent device.

12. The system of claim 11, wherein the discussion group event data further comprises client language data, the client language data further comprising a data object that sets one or more languages for one or more client devices.

* * * * *